United States Patent
Risbeck

(10) Patent No.: US 12,061,005 B2
(45) Date of Patent: Aug. 13, 2024

(54) DIRECT POLICY OPTIMIZATION FOR MEETING ROOM COMFORT CONTROL AND ENERGY MANAGEMENT

(71) Applicant: Tyco Fire & Security GmbH, Neuhausen am Rheinfall (CH)

(72) Inventor: Michael James Risbeck, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 257 days.

(21) Appl. No.: 17/204,605

(22) Filed: Mar. 17, 2021

(65) Prior Publication Data

US 2022/0299233 A1 Sep. 22, 2022

(51) Int. Cl.
| | |
|---|---|
| *F24F 11/70* | (2018.01) |
| *G05B 13/02* | (2006.01) |
| *G06F 18/20* | (2023.01) |
| *G06N 3/08* | (2023.01) |
| *F24F 110/10* | (2018.01) |
| *F24F 120/10* | (2018.01) |

(52) U.S. Cl.
CPC ............ *F24F 11/70* (2018.01); *G05B 13/021* (2013.01); *G05B 13/027* (2013.01); *G06F 18/285* (2023.01); *G06N 3/08* (2013.01); *F24F 2110/10* (2018.01); *F24F 2120/10* (2018.01)

(58) Field of Classification Search
CPC .... F24F 11/70; F24F 2110/10; F24F 2120/10; G05B 13/021; G05B 13/027; G06K 9/6227; G06N 3/08
See application file for complete search history.

(56) References Cited

U.S. PATENT DOCUMENTS

| | | |
|---|---|---|
| 9,447,985 B2 | 9/2016 | Johnson |
| 10,871,756 B2 | 12/2020 | Johnson et al. |
| 10,908,578 B2 | 2/2021 | Johnson et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

R. Sendra-Arranz, "A long short-term memory artificial neural network to predict daily HVAC consumption in buildings", Mar. 19, 2020, Elsevier, Energy & Buildings 216 (2020) 109952 (Year: 2020).*

(Continued)

*Primary Examiner* — Christopher W Carter
(74) *Attorney, Agent, or Firm* — Foley & Lardner LLP

(57) ABSTRACT

A method for controlling temperature in a building zone to increase comfort and energy efficiency is shown. The method includes receiving historical data, the historical data indicative of the temperature and occupancy of the building zone during one or more historical states. The method includes training a system model to represent a dynamic response of the building zone based on the historical data. The method includes determining a control law by optimizing a policy function implemented as a neural network configured to process the trained system model. The method includes performing online control of the building zone using the control law.

20 Claims, 15 Drawing Sheets

(56) References Cited

U.S. PATENT DOCUMENTS

| | | | |
|---|---|---|---|
| 10,921,768 | B2 | 2/2021 | Johnson et al. |
| 11,156,978 | B2 | 10/2021 | Johnson et al. |
| 11,514,305 | B1* | 11/2022 | Commons ................. G06N 3/04 |
| 11,579,573 | B2* | 2/2023 | Petrus ................. G05B 13/0265 |
| 2003/0055798 | A1 | 3/2003 | Hittle et al. |
| 2010/0262298 | A1* | 10/2010 | Johnson .................... F24F 11/30 |
| | | | 700/277 |
| 2013/0085614 | A1* | 4/2013 | Wenzel ................. G05B 13/021 |
| | | | 700/277 |
| 2014/0045482 | A1* | 2/2014 | Bisson .................. H04W 4/021 |
| | | | 455/420 |
| 2014/0279745 | A1* | 9/2014 | Esponda ................. G06N 5/043 |
| | | | 706/12 |
| 2015/0178865 | A1* | 6/2015 | Anderson ............ G06Q 50/163 |
| | | | 705/7.25 |
| 2016/0305678 | A1* | 10/2016 | Pavlovski .............. G05B 15/02 |
| 2018/0260248 | A1* | 9/2018 | Przybylski ............... F24F 11/32 |
| 2020/0302234 | A1* | 9/2020 | Walters ............... G06F 16/9035 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

(56) References Cited

OTHER PUBLICATIONS

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

\* cited by examiner

DIRECT POLICY OPTIMIZATION FOR MEETING ROOM COMFORT CONTROL AND ENERGY MANAGEMENT

BACKGROUND

The present disclosure relates generally to building management systems (BMS). More specifically, the present disclosure relates generally to BMS systems implementing model-based control schemes.

A BMS may be configured to control certain comfort levels (e.g., temperature levels, etc.) for building occupants in a building zone. The comfort levels may be at least in part affected by the occupancy of the building zone. There exists a need to save energy costs while appropriately maintaining and balancing occupant comfort.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for controlling temperature in a building zone to increase comfort and energy efficiency. The method includes receiving historical data, the historical data indicative of the temperature and occupancy of the building zone during one or more historical states. The method includes training a system model to represent a dynamic response of the building zone based on the historical data. The method includes determining a control law by optimizing a policy function implemented as a neural network configured to process the trained system model. The method includes performing online control of the building zone using the control law.

In some embodiments, training the system model to represent the dynamic response of the building zone includes training a plurality of models, each of the plurality of models configured to represent a system response, wherein each system response uses different control schemes, wherein the plurality of models includes the system model and selecting the system model based on the system model responsive to determining an accuracy of the system model in representing the dynamic response of the building zone is higher than an accuracy of other models of the plurality of models.

In some embodiments, determining the control law by optimizing the policy includes minimizing an average value of a cost function using a plurality of policy functions each implemented as a neural network and configured to process the trained system model and selecting the control law from a plurality of control laws responsive to identifying a policy function of the plurality of policy functions resulting in a lowest minimized average value associated with the cost function.

In some embodiments, training the system model includes training at least one of a Long Short Term Memory (LSTM) model, a Greybox model, a linear physics model, or a disturbance model and determining the control law by optimizing the policy includes optimizing at least one of a dense policy, a naïve policy, or a rule-based policy.

In some embodiments, performing online control of the building zone using a rule-based policy, the rule-based policy configured to receive state data of the building zone and determine temperature setpoint adjustments based on the state data and collecting the state data and associated temperature setpoint adjustments over a period of time to be used as the historical data. In some embodiments, training the system model to represent the dynamic response of the building zone includes training the system model using the collected state data and associated temperature setpoint adjustments. In some embodiments, determining the control law by optimizing a policy function implemented as a neural network and performing online control of the building zone using the control law includes performing online control using the control law determined by optimizing the policy function implemented as the neural network after performing online control of the building zone using the rule-based policy.

In some embodiments, the method further includes comparing an implementation of the rule-based policy with an implementation of the control law, determining that the implementation of the control law provides an increased level of comfort or increased level of energy savings above a predetermined threshold, and replacing online control using the rule-based policy with online control using the control law.

In some embodiments, training the system model includes training the system model to determine adjustments of manipulated variables (MVs) that will approach a control variable (CV) setpoint based on the historical data, the historical data comprising sets of CVs, MVs, and disturbance variables (DVs). In some embodiments, the CVs include at least one of: the temperature of the building zone or variable air volume (VAV) airflow entering the building zone, the MVs include at least one of: a heating setpoint of the building zone or a cooling setpoint of the building zone, and the DVs include at least one of: ambient temperature, solar intensity, or scheduled occupancy of the building zone.

Another implementation of the present disclosure is a controller for controlling temperature in a building zone to increase comfort and energy efficiency. The controller includes one or more processors and one or more memories storing instructions that, when executed by the one or more processors, cause the one or more processors to perform operations. The operations include receiving historical data, the historical data indicative of the temperature and occupancy of the building zone during one or more historical states. The operations include training a system model to represent a dynamic response of the building zone based on the historical data. The operations include determining a control law by optimizing a policy function implemented as a neural network configured to process the trained system model. The operations include performing online control of the building zone using the control law.

In some embodiments, training the system model to represent the dynamic response of the building zone includes training a plurality of models, each of the plurality of models configured to represent a system response, wherein each system response uses different control schemes, wherein the plurality of models includes the system model and selecting the system model based on the system model responsive to determining an accuracy of the system model in representing the dynamic response of the building zone is higher than an accuracy of other models of the plurality of models.

In some embodiments, training the system model includes training at least one of a Long Short Term Memory (LSTM) model, a Greybox model, a linear physics model, or a disturbance model. In some embodiments, determining the control law by optimizing the policy includes optimizing at least one of a dense policy, a naïve policy, or a rule-based policy.

In some embodiments, determining the control law by optimizing the policy includes minimizing an average value of a cost function using a plurality of policy functions each implemented as a neural network and configured to process the trained system model and selecting the control law from a plurality of control laws responsive to identifying a policy function of the plurality of policy functions resulting in a lowest minimized average value associated with the cost function.

In some embodiments, the one or more processors are further configured to perform online control of the building zone using a rule-based policy, the rule-based policy configured to receive state data of the building zone and determine temperature setpoint adjustments based on the state data and collect the state data and associated temperature setpoint adjustments over a period of time to be used as the historical data. In some embodiments, training the system model to represent the dynamic response of the building zone includes training the system model using the collected state data and associated temperature setpoint adjustments. In some embodiments, wherein determining the control law by optimizing a policy function implemented as a neural network and performing online control of the building zone using the control law includes performing online control using the control law determined by optimizing the policy function implemented as the neural network after performing online control of the building zone using the rule-based policy.

In some embodiments, the one or more processors are further configured to compare an implementation of the rule-based policy with an implementation of the control law, determine that the implementation of the control law provides an increased level of comfort or increased level of energy savings above a predetermined threshold, and replace online control using the rule-based policy with online control using the control law.

In some embodiments, training the system model includes training the system model to determine adjustments of manipulated variables (MVs) that will approach a control variable (CV) setpoint based on the historical data, the historical data comprising sets of CVs, MVs, and disturbance variables (DVs). In some embodiments, the CVs include at least one of: the temperature of the building zone or variable air volume (VAV) airflow entering the building zone. In some embodiments, the MVs include at least one of: a heating setpoint of the building zone or a cooling setpoint of the building zone. In some embodiments, the DVs include at least one of: ambient temperature, solar intensity, or scheduled occupancy of the building zone.

Another implementation of the present disclosure is one or more non-transitory computer-readable storage media having computer-executable instructions stored thereon that, when executed by one or more processors of a control system, cause the control system to perform operations. The operations include receiving historical data, the historical data indicative of the temperature and occupancy of a building zone during one or more historical states. The operations include training a plurality of models, each of the plurality of models configured to represent a system response, wherein the plurality of models includes a system model. The operations include selecting the system model based on the system model responsive to determining accuracy of the system model in representing a dynamic response of the building zone is higher than an accuracy of other models of the plurality of models. The operations include determining a control law by optimizing a policy function implemented as a neural network configured to process the trained system model. The operations include performing online control of the building zone using the control law to pre-condition the building zone.

In some embodiments, using the control law to pre-condition the building zone includes providing control signals to heating, ventilation, and air conditioning (HVAC) equipment to lower the temperature of the building zone prior to the building zone being occupied or providing control signals to the HVAC equipment to increase the temperature of the building zone prior to the building zone being occupied.

In some embodiments, determining the control law by optimizing the policy includes minimizing an average value of a cost function using a plurality of policy functions each implemented as a neural network and configured to process the trained system model and selecting the control law from a plurality of control laws responsive to identifying a policy function of the plurality of policy functions resulting in a lowest minimized average value associated with the cost function.

In some embodiments, training the system model includes training at least one of a Long Short Term Memory (LSTM) model, a Greybox model, a linear physics model, or a disturbance model. In some embodiments, determining the control law by optimizing the policy includes optimizing at least one of a dense policy, a naïve policy, or a rule-based policy.

In some embodiments, the media further includes performing online control of the building zone using a rule-based policy, the rule-based policy configured to receive state data of the building zone and determine temperature setpoint adjustments based on the state data and collecting the state data and associated temperature setpoint adjustments over a period of time to be used the historical. In some embodiments, training the system model to represent the dynamic response of the building zone includes training the system model using the collected state data and associated temperature setpoint adjustments. In some embodiments, determining the control law by optimizing a policy function implemented as a neural network and performing online control of the building zone using the control law includes performing online control using the control law determining by optimizing the policy function implemented as the neural network after performing online control of the building zone using the rule-based policy.

In some embodiments, training the system model includes training the system model to determine adjustments of manipulated variables (MVs) that will approach a control variable (CV) setpoint based on the historical data, the historical data comprising sets of CVs, MVs, and disturbance variables (DVs). In some embodiments, the CVs includes at least one of: the temperature of the building zone or variable air volume (VAV) airflow entering the building zone. In some embodiments, the MVs include at least one of: a heating setpoint of the building zone or a cooling setpoint of the building zone. In some embodiments, the DVs include at least one of: ambient temperature, solar intensity, or scheduled occupancy of the building zone.

DETAILED DESCRIPTION

Overview

Figure 1:
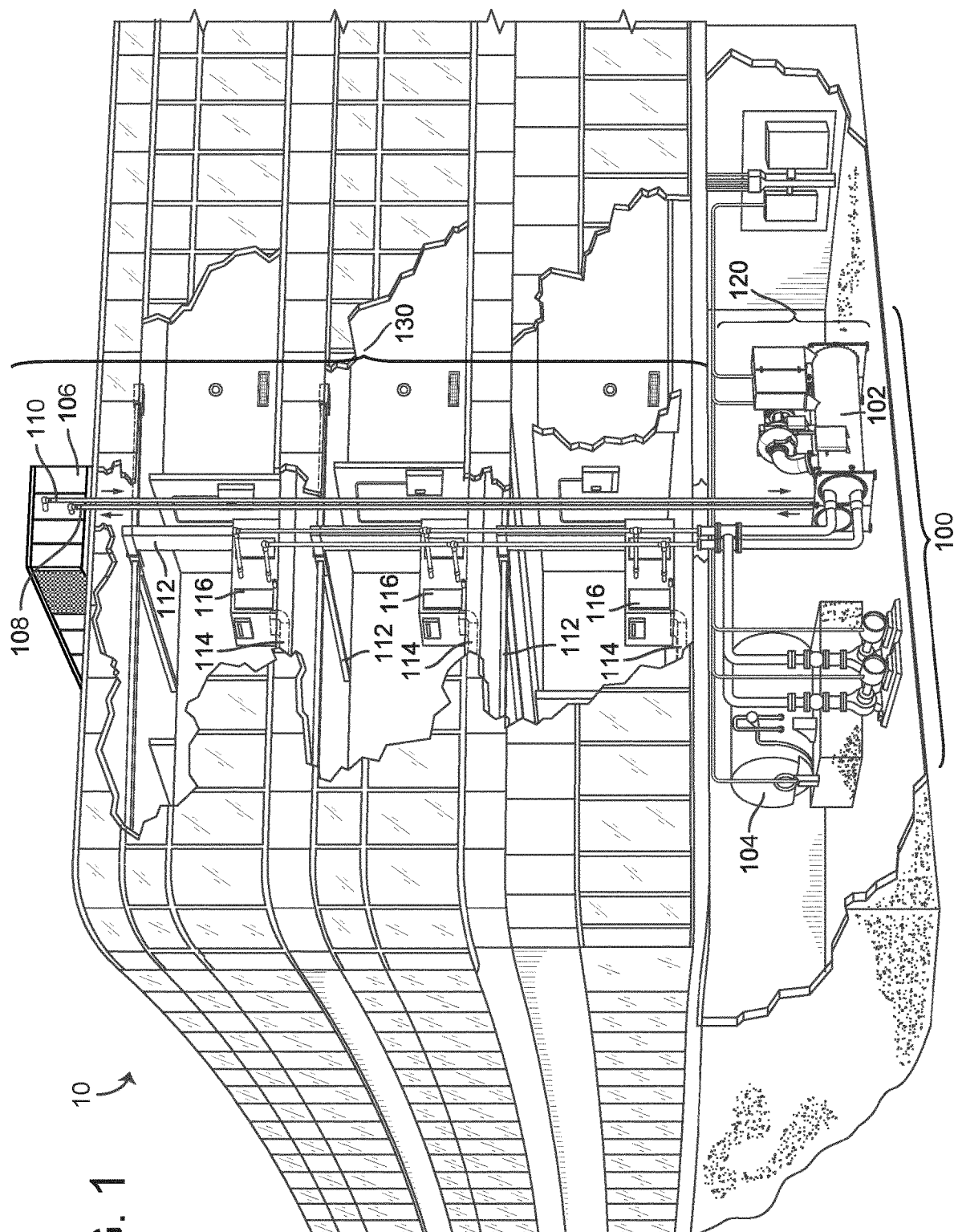
FIG. 1 is a schematic drawing of a building equipped with an HVAC system, according to some embodiments.

Referring generally to the FIGURES, systems and methods for implementing a direct policy optimization (DPO) formulation (e.g., framework, schema, control solution, etc.) for comfort control within a building zone (e.g., room comfort, etc.) and energy management (e.g., optimizing energy efficiency, etc.). At a high level, there can be time-varying upper and lower temperature comfort bounds for a building zone (e.g., a room, etc.). Given these time-varying upper and lower temperature comfort bounds for a single room, it can be desirable to determine the heating and cooling temperature setpoint trajectories that maintains zone temperature within the bounds with minimum energy consumption.

In some embodiments, the systems and methods disclosed herein may pre-heat and/or pre-cool temperatures in building zones to both increase energy savings and account for comfort levels of one or more building occupants. For example, the BMS may begin cooling a building zone 10 minutes prior to meeting attendees entering the building zone (e.g., a meeting room). This may allow the building zone to be pre-cooled prior to the meeting without attempting to cool the building zone with the increased heat of the meeting attendees during the meeting.

In some embodiments, rooms with variable occupancy patterns have potential to save energy on space heating and cooling by setting back the room's temperature setpoint when the space has low or zero occupancy. During these times, the thermal comfort requirements may be much looser, as there is no one in the space to become uncomfortable due to the room's temperature being too hot or too cold. However, once occupancy resumes, it may be necessary to restore thermal comfort, and because of the potential non-instant dynamics of a local regulatory control layer, the room temperature setpoints may need to be adjusted before the start of occupancy to ensure that the temperature change is actually completed by the time occupants arrive. As such, an "optimal-start" algorithm that can be applied throughout the day may be beneficial.

The systems and methods disclosed herein provide a control solution that trains dynamic models for each room and then uses those models to determine optimal temperature setpoint trajectories. The goal of the control solution may include minimizing room-level energy consumption (e.g., as estimated via the room's airflow) subject to maintaining thermal comfort within the space (e.g., as determined by time-varying temperature bounds). In some embodiments, to improve deployability and online computational efficiency, this control solution may use an optimal-control framework called direct policy optimization (DPO). Under the DPO framework, a policy function or control law may be defined in terms of unknown mathematical parameters and those parameters are optimized directly to minimize a given performance objective for the room using a data-driven dynamic model to make predictions. In some embodiments, when the control law is deployed, the only online computation required is a straightforward and explicit evaluation of the policy function, which may be significantly faster and more robust compared to other optimal-control technologies like model predictive control that require online solutions to optimization problems. DPO may facilitate a seamless transition from simple heuristic policies (e.g., that can be deployed with zero training data to capture much of the available cost savings) to complex blackbox policies (e.g., that require training data but can deliver much better performance by adapting to the specifics of each room).

In some embodiments, the DPO framework mentioned above includes generating an optimal control problem and solving it by training a neural-network control law using a data-driven dynamic model of the system. Advantageously, this DPO framework may achieve closed-loop performance levels that can be achieved via model predictive control, but with significant reductions in the online computation that must occur. Additionally, the required training time is generally significantly faster than required for reinforcement learning and similar techniques.

In some embodiments, a rule-based control law for which default tuning parameters can be obtained without any training data, is implemented. The rule-based control law can then be used for initial deployment until enough training data has been generated to train a dynamic system model. At that point, the parameters of the rule-based control law can be optimized using the dynamic model, or a neural-network control law can be trained as a replacement that can potentially capture additional energy savings due to its increased flexibility. The proposed DPO framework may therefore allow for both efficient deployment to provide immediate cost savings and continual performance improvement over time as more data becomes available.

While the current systems and methods disclosed herein pertain generally to at least temperature control in a building, the general DPO framework can be applied to a wider variety of problems. For example, the current formulation could be modified to consider time-varying energy prices over a longer horizon, which may allow the use of passive thermal energy storage to reduce overall costs, wherein the dynamic models disclosed herein may be applicable to this problem. The DPO framework may also be extended to incorporate indoor air quality (IAQ) control that can include the fresh-air ventilation rate and supply temperature setpoint added as manipulated variables (MVs). Such an extension may not require additional sensors to take the necessary measurements, but may provide an implicit source of monitoring and may improve wellness for building occupants.

In some embodiments, the temperature constraints are generated and the time-varying temperature bounds may be generated based on an occupancy schedule for the space. The default algorithm may be to define a range of comfortable temperatures (e.g., 22-24° C., etc.) for when the room is occupied and to define a wider range of comfortable temperatures (e.g., 20° C. to 27° C.) for when the room is unoccupied. The time-varying comfort bounds can then be directly mapped based on whether the scheduled occupancy is nonzero at each time point. These and similar algorithms (e.g., linear decay algorithms that decay toward the unoccupied bounds when the occupancy is nonzero but below some established low threshold, etc.) may require an accurate occupancy forecast, and may therefore be focused on spaces like meeting rooms that have an accurate calendar from which an occupancy schedule can be inferred.

In some embodiments, once thermal comfort has been established, the optimizer (e.g., the controller, etc.) is then free to reduce energy usage. In some embodiments, room-level HVAC energy use is nearly impossible to measure directly, and the actual consumption generally takes place at an air handling unit (AHU) that serves multiple spaces. As such, the room-level airflow may be substituted as a surrogate for energy consumption. In some embodiments, to a first-order approximation, energy consumption is proportional to airflow, as the air stream may either be cooled or heated by the AHU coil and then blown into the space via an AHU fan.

In some embodiments, one or more assumptions may be made by controller 502 to simplify the generation of one or more control laws, such as no time-varying electricity prices or peak demand charges are considered by controller 502, for simplicity purposes. In some embodiments, controller 502 allows optimization over shorter timescales which can make modeling of the building zone easier and/or more efficient. In some embodiments, zone VAV air flow rate is a proxy for zone energy consumption, as true energy consumption depends on external factors (ambient temperature and humidity, flows from other zones, etc.). In some embodiments, controller 502 receives time-varying comfort bounds as an input. In other embodiments, controller 502 does consider one or more of the above-mentioned parameters in the methods disclosed herein.

Building Management System and HVAC System
HVAC System

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

In some embodiments, building 10 acts as a building or campus (e.g., several buildings) capable of housing some or all components of HVAC system 100. While the systems and methods described herein are primarily focused on operations within a typical building (e.g., building 10), they can easily be applied to various other enclosures or spaces (e.g., cars, airplanes, recreational vehicles, etc.).

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flowrate, temperature, or other attributes of the supply airflow through AHU 106 to achieve setpoint conditions for the building zone.

Waterside System

Figure 2:
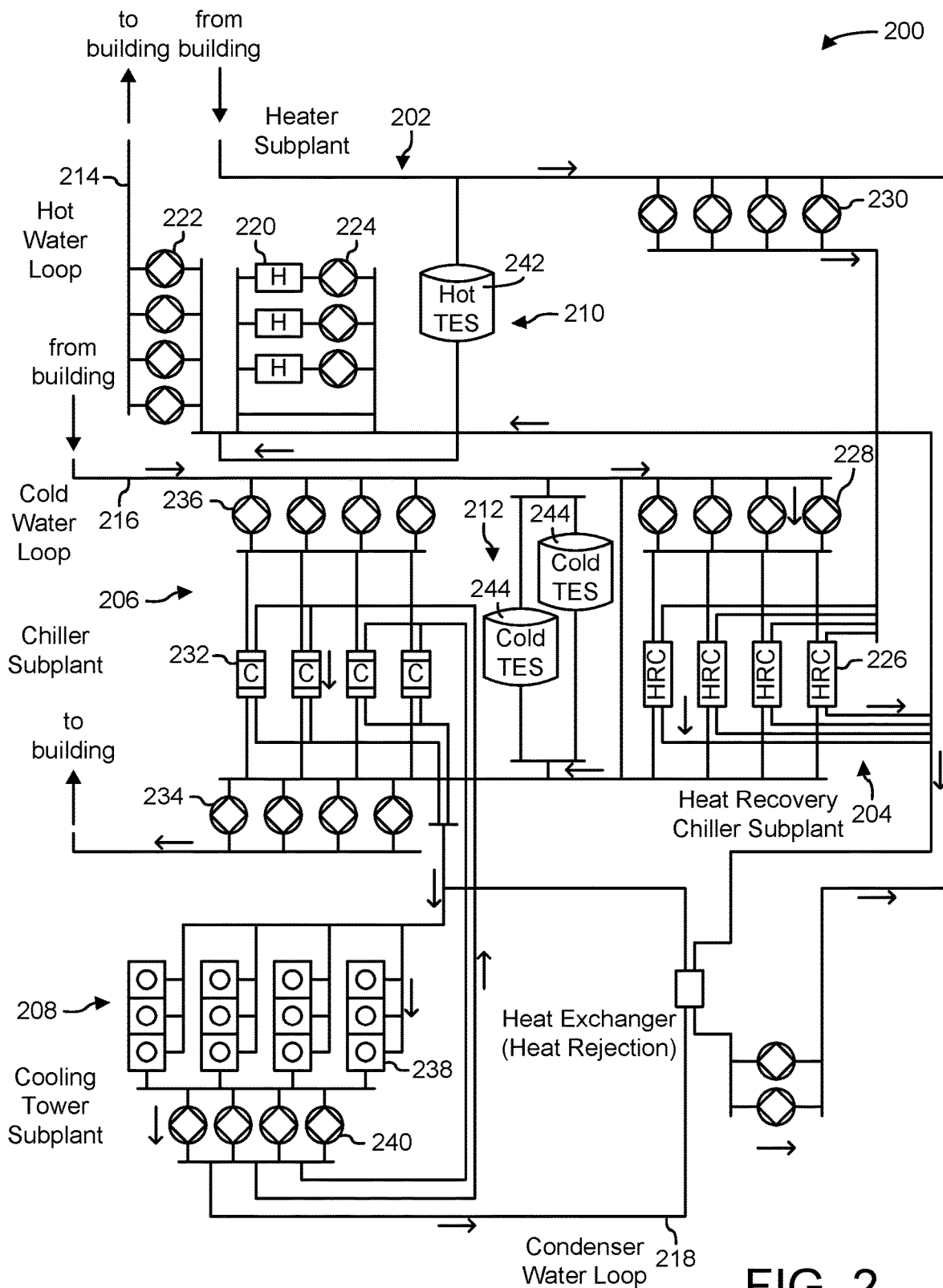
FIG. 2 is a schematic drawing of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flowrate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flowrate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flowrate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flowrate of the condenser water through individual cooling towers 238.

Hot TES subplant 210 is shown to include a hot TES tank 242 configured to store the hot water for later use. Hot TES subplant 210 may also include one or more pumps or valves configured to control the flowrate of the hot water into or out of hot TES tank 242. Cold TES subplant 212 is shown to include cold TES tanks 244 configured to store the cold water for later use. Cold TES subplant 212 may also include one or more pumps or valves configured to control the flowrate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Airside System

Figure 3:
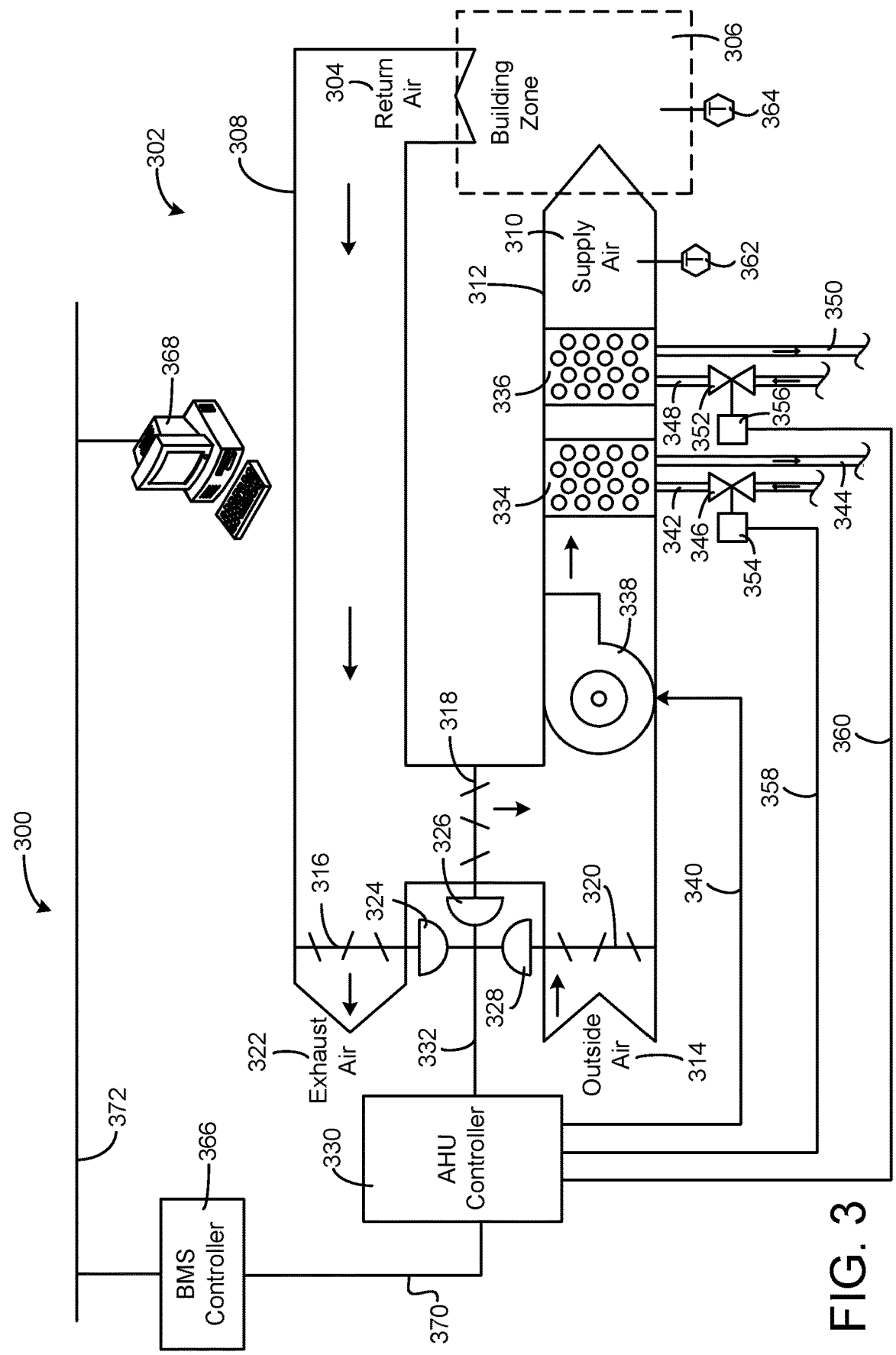
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100, or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flowrate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flowrate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flowrate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management System

Figure 4:
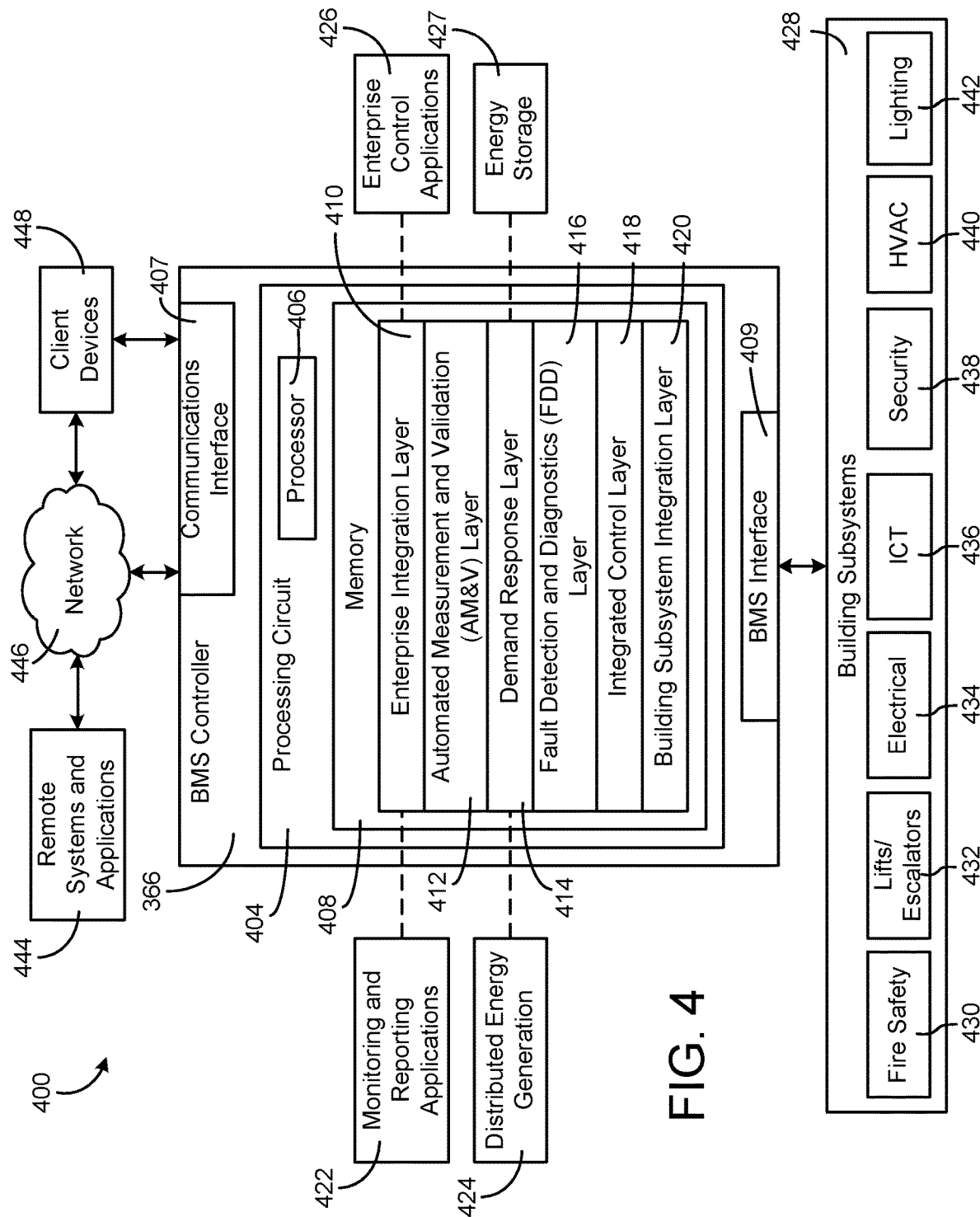
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application-specific integrated circuit (ASIC), one or more field-programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide ongoing fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Direct Policy Optimization (DPO) System
DPO Overview

Figure 5:
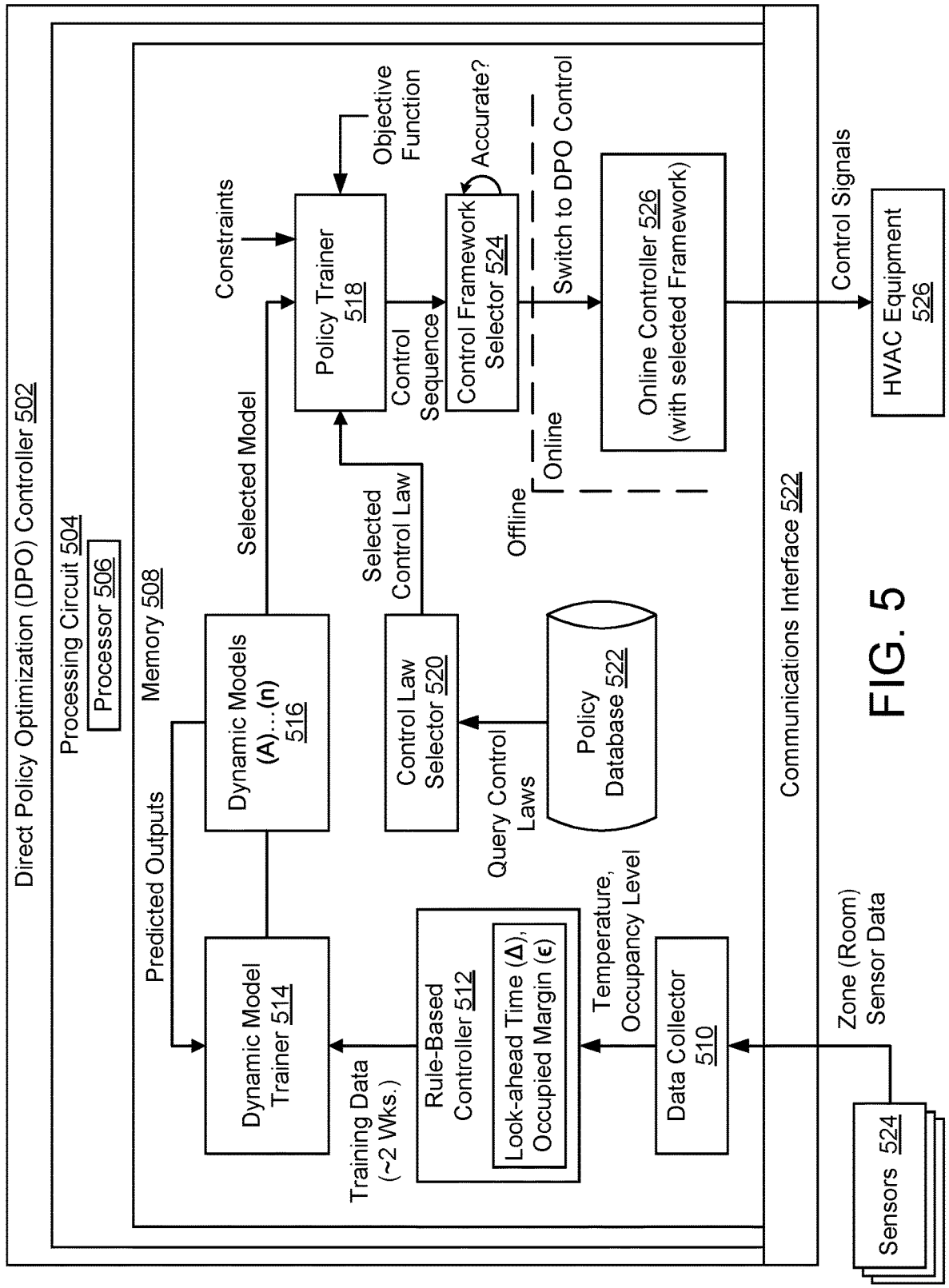
FIG. 5 is a block diagram of a controller for implementing direct policy optimization (DPO), which can be implemented in the BMS system of FIG. 4, according to some embodiments.

Referring now to FIG. 5, a block diagram of a DPO controller for implementing online control of a building zone is shown, according to some embodiments. DPO controller 502 ("controller 502") may be incorporated partially or entirely with any of the other controlling devices disclosed herein, such as BMS controller 366. In other embodiments, DPO controller 502 is a stand-alone controller specifically implemented for online control of one or more building zones. DPO controller 502 is shown to include processing circuit 504, including processor 506 and memory 508. The processing circuit 504 can be communicably connected to the communications interface 523 such that the processing circuit 504 and the various components thereof can send and receive data via the communications interface 523. The processor 506 can be implemented as a general purpose processor, an application-specific integrated circuit (ASIC), one or more field-programmable gate arrays (FPGAs), a group of processing components, or other suitable electronic processing components.

The memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 508 can be or include volatile memory or non-volatile memory. The memory 508 can include database components, object code components, script components, or any other type of information structure for supporting the various activities and information structures described in the present application. According to an exemplary embodiment, the memory 508 is communicably connected to the processor 506 via the processing circuit 504 and includes computer code for executing (e.g., by the processing circuit 504 and/or the processor 506) one or more processes described herein. In some embodiments, the controller 502 is implemented within a single computer (e.g., one server, one housing, etc.). In various other embodiments the controller 502 can be distributed across multiple servers or computers (e.g., that can exist in distributed locations).

The communications interface 523 can facilitate communications between controller 502 and other systems in building 10 (e.g., HVAC subsystem 440, etc.) for allowing user control, monitoring, and adjustment to the controller 502 and/or the one or more systems in building 10. The communications interface 523 can be or include wired or wireless communications interfaces (e.g., jacks, antennas, transmitters, receivers, transceivers, wire terminals, etc.) for conducting data communications within the system or other external systems or devices. In various embodiments, communications via the communications interface 523 can be direct (e.g., local wired or wireless communications) or via a communications network (e.g., a WAN, the Internet, a cellular network, etc.). For example, the communications interface 523 can include an Ethernet card and port for sending and receiving data via an Ethernet-based communications link or network. In another example, the communications interface 523 can include a Wi-Fi transceiver for communicating via a wireless communications network.

Memory 508 is shown to include data collector 510, rule-based controller 512, dynamic model trainer 514, dynamic models 516, policy trainer 518, control law selector 520, policy database 522, control framework selector 524, and online controller 526. Controller 502 is shown to be communicably connected to sensors 524 and HVAC equipment 527.

Data collector 510 may be configured to receive either real-time data of a building 10 or building zone (e.g., a room, a floor, a lobby, an area of building 10, etc.) of building, historical data, or a combination thereof. In some embodiments, data collector 510 receives zone sensor data from sensors 524 that are obtaining measurements of comfort control within the zone and providing the data to data collector 510. In some embodiments, this sensor data can include the measured temperature in the room, an occupancy value that may indicate the number of persons in the room, flow rate of air flowing from the air handling unit (AHU) in the zone, and other measurements that may pertain to the overall temperature in the zone.

In some embodiments, data collector 510 receives historical data from a database (not shown) and provides this data directly to dynamic model trainer 514 for training, without implementing rule-based controller 512. In such embodiments, there may be sufficient training data stored within the system such that there is not a need to implement rule-based controller 512 to generate the training data that trains dynamic model trainer 514. Data collector 510 is shown to provide sensor data (e.g., temperature, occupancy level, etc.) to rule-based controller 512.

Rule-Based Heuristics

Rule-based controller 512 may be configured to implement rule-based heuristics to control the building zone, in some embodiments. In some embodiments, rule-based controller 512 determines a setpoint (e.g., temperature setpoint) for the building zone based occupancy schedules and comfort levels. For example, controller 502 may receive data sets of the building zone indicating that the building zone (e.g., a meeting room in building 10) will have a 15-person meeting in the building zone in 2 hours. Rule-based controller 512 may adjust the setpoint to the building zone based on the temperature setpoints from previous meetings (e.g., which can be indicative of comfort, etc.) and the time of the meeting to adjust the temperature of the room at a specific time.

In some embodiments, the policies implemented by policy trainer 518 can provide more flexibility than rule-based controller 512, but may require a large amount of historical data (e.g., training data, etc.) to properly train. Thus, in the interim, between initial deployment and collecting sufficient data, a policy can be used to control these systems, such as the policies performed by rule-based controller 512. The actions performed by rule-based controller 512 may capture most of the available performance improvements without requiring a significant amount of training data.

To develop a heuristic control policy, two aspects of the building zone temperature adjustment may be considered. First, since the difference between occupied and unoccupied temperature bounds can be fixed, the time required to move the zone to the occupied comfort region is roughly constant. Second, due to natural variation in disturbances and regulatory control, keeping the zone temperature setpoint exactly at a comfort bound may be likely to cause small comfort violations. Based on these observations, the following control policy is defined:

$$T_t^{sp,cool} = \min_{t \le t' \le t+\Delta} T_{t'}^{max} - \epsilon \quad (1)$$

$$T_t^{sp,heat} = \min_{t \le t' \le t+\Delta} T_{t'}^{min} + \epsilon$$

Where $T^{sp,cool}$ and $T^{sp,heat}$ are the cooling and heating setpoints of the building zone, respectively. They may be calculated from the parameters $T^{min}$ and $T^{max}$, which are the (e.g., time-varying, etc.) minimum and maximum comfort bounds (e.g., which must be available for $\Delta+1$ timesteps ahead). The adjustable parameters for the rule-based policy are shown to include the lookahead time $\Delta$ and the backoff margin $\epsilon$. In some embodiments, since there is no dependence on the current system state, this policy can be considered structurally naive, which gives the functional dependence as $u = \kappa_\psi(r)$ with:

$$u := (T^{sp,cool}, T^{sp,heat})$$

$$r := (T_t^{min}, \ldots, T_{t+\Delta}^{min}, T_t^{max}, \ldots, T_{t+\Delta}^{max})$$

$$\psi := (\Delta, \epsilon) \quad (2)$$

In some embodiments, the min and max operators in Eq. (2) calculate the tightest (e.g., most restrictive, etc.) comfort region over the next $\Delta$ future timesteps and adjust the setpoints to those values, which can be tightened by $\epsilon$ to account for local variation. For cooling the building zone, the net effect can be that the cooling setpoint will be decreased $\Delta$ timesteps before the start of each occupied period and will be increased exactly at the end of each occupancy period (with the appropriate mirrored behavior for the heating setpoint).

In some embodiments, the structure of rule-based policies can be implemented by controller 502 while the parameters are optimized via direct policy optimization. The policy rules can be translated into a network with continuous parameters. In some embodiments, the lookahead parameter $\Delta$ is effectively discrete, and thus the parameterization from Eq. (2) cannot be directly used. Instead, the calculation may need to be re-parameterized in terms of continuous variables. For this process, a finite set of possible values of $\{\Delta_i\}$ $\{0, 1, \ldots, \overline{\Delta}\}$ may be chosen for a given maximum value $\overline{\Delta}$. The scalar parameter $\Delta$ can then be replaced with a set of weights $\rho_i$ (e.g., one for each value of i, etc.).

To use these new weights at time t, each index i may be defined as the following:

$$T_{it}^{sp,cool} = \min_{t \le t' \le t+\Delta_i} T_{t'}^{max} \quad (3)$$

$$T_{it}^{sp,heat} = \min_{t \le t' \le t+\Delta_i} T_{t'}^{min}$$

Which may act as the original control law described in Eqs. (1-2) evaluated for $\Delta = \Delta_i$ and $\epsilon = 0$. These calculations may not depend on the parameters $\psi = (\rho_i, \epsilon)$, and can be computed ahead of time and may need not be differentiable. In some embodiments, the output of the neural network policy may be defined as:

$$T_t^{sp,cool} = \frac{\sum_i T_{it}^{sp,cool} \exp(\rho_i)}{\sum_i \exp(\rho_i)} - \epsilon \quad (4)$$

$$T_t^{sp,heat} = \frac{\sum_i T_{it}^{sp,heat} \exp(\rho_i)}{\sum_i \exp(\rho_i)} + \epsilon$$

which can compute the setpoints as a Boltzmann-weighted sum of the setpoints corresponding to each discrete value $\Delta_i$. Thus, instead of having to adjust the discrete parameter $\Delta$, this neural-network parameterization instead allows the optimizer to adjust the continuous weights $\rho_i$, assigning maximum value to the optimal lookahead time. In contrast to the original Eq. (1), the new (22) is continuously differentiable in the parameters $\psi = (\rho_i, \epsilon)$.

In some embodiments, the parameterization described in Eq. (4) provides more flexibility to the optimizer than Eq. (1) since the optimizer can choose any convex sum of the finite set of ($\Delta_i$, $\in$) policies. However, in practice, the optimizer may tend to assign large weight to only one value of $\rho_i$, thus effectively choosing only one policy.

In some embodiments, a motivation behind the heuristic rule-based policy may be to allow this solution to be deployed without requiring any historical operational data available for initial training. Due to the policy's simple form, reasonable values $\Delta\approx25$ min and $\in\approx0.1°$ C., as an example, will give satisfactory (though suboptimal) performance for almost any space. After deploying this policy for period of time (e.g., 1 to 2 weeks), there may be enough data to build a reasonably accurate Greybox model that can be used to refine the initial values of these parameters. Finally, after 1 to 2 months of data is available, a more accurate Greybox or LSTM model may be trained and the use of dense policies based on coverage of the desired state space may be considered.

In some embodiments, another motivation behind the heuristic rule-based policy is explainability. Although the dense policies may achieve better performance than the heuristic policies, actually achieving those improvements may be challenging. However, while it can be difficult for a dense policy to meaningfully explain how the setpoints are chosen or why a particular policy was chosen as optimal, the logic behind the heuristic policy can be easily explained. In particular, the slight differences in the chosen $\Delta$ and $\in$ for similar rooms can be better motivated as stemming from the slight differences between the rooms, whereas the complete lack of similarity between the weights of two dense policies is likely to cause confusion. As such, building operators are likely to be more accepting of the heuristic policies compared to dense, and so the minor loss of performance is outweighed by increased applicability. Of course, any and all policies disclosed herein, either alone or in combination, may be implemented by controller 502.

Long Short-Term Memory (LSTM) Modeling

Dynamic model trainer 514 is shown to receive training data from rule-based controller 512. In some embodiments, dynamic model trainer 514 trains one or more models that may all be configured to make accurate predictions of temperature setpoints for the building zone. In some embodiments, dynamic model training is based on the predicted model outputs. Several types of models can be considered, such as Long Short Term Memory (LSTM) models and Greybox models. In some embodiments, dynamic model trainer 514 is configured to train a state-space system model by solving a system identification problem, discussed above.

To model the temperature dynamics of the building zone (e.g., one or more meeting rooms, etc.) two different model forms can be used (e.g., LSTM models and Greybox models). Both models may have the same inputs and outputs, which are as follows. Inputs can include: zone heating setpoint $T_{sp}^h$, zone cooling setpoint $T_{sp}^c$, ambient temperature $T_a$, ambient cloudiness $\mathcal{C}$ (or similar quantity like solar intensity), scheduled zone occupancy $\mathcal{O}$ (number of occupants where available, but at least a binary flag), hour of day t (generally as an SOS2 encoding with 24 elements), and day of week d (generally as a one-hot encoding with 7 elements). The outputs can include zone temperature $T_z$, and VAV airflow $f_{VAV}$. In some embodiments, the time steps of the models can be identical or different between the models and can be any amount of time (e.g., 5 minutes, 10 minutes, etc.).

In some embodiments, the equations defining an LSTM model can be presented in state-space form. While this model can be used directly to describe system dynamics, it can also be embedded within the hybrid Greybox model (e.g., Greybox model 712 described below, etc.) where it can serve as a disturbance predictor. In the LSTM system, the state x can be partitioned into three substates, $x_1$, $x_2$, and $x_3$, which respectively represent the velocity, position, and local prediction error of the system (e.g., the building zone, etc.). Under the nominal model, these states evolve can as:

$$x_1^+:=x_1\odot\phi_1+\text{sgm}(\phi_2)\odot\tanh(\phi_3)$$

$$x_2^+:=\tanh(x_1^+)\odot\text{sgm}(\phi_3)$$

$$x_3^+:=0 \quad (5)$$

in which:

$$\phi_i:=A_ix_2+K_ix_3+B_iu+f_i \quad (6)$$

wherein $a\odot b$ represents elementwise multiplication of two vectors a and b. The value of $x_1^+$ appears on the right-hand side of the equation defining $x_2^+$. For the purposes of filtering, $\hat{x}(t)$ denotes the estimated value of x at time t before considering the measured value of y(t), and $\check{x}(t)$ denotes the filtered estimate after considering y(t). Thus, the filtering step may be:

$$\check{x}_1:=\hat{x}_1$$

$$\check{x}_2:=\hat{x}_2$$

$$\check{x}_3:=L(y-C\hat{x}-h) \quad (7)$$

The first two substates $x_1$ and $x_2$ may be unaffected, while $x_3$ is updated with the current prediction error. This structure allows the system to isolate all nonlinearity to the state evolution Eq. (5) while still ensuring that the internal model states can be updated in the next step using the information provided in system measurements.

Finally, the LSTM model's output is given as $$\hat{y}:=Cx+h \quad (8)$$

in which x is the concatenated state ($x_1$, $x_2$, $x_3$). The above equations (5), (7), and (8) may be denoted as:

$$x^+=f_\theta^{LSTM}(x,u)$$

$$\check{x}=g_\theta^{LSTM}(\hat{x},y)$$

$$\hat{y}=h_\theta^{LSTM}(x) \quad (9)$$

respectively, in which the subscript $\theta$ indicates dependence on the value of the trainable parameters, which include the matrices $A_i$, $B_i$, $K_i$, L and C, as well as the vectors $f_i$ and h (which can be trainable parameters). These parameters may be adjusted so that the model fits known u, y data.

In some embodiments, the filter gain L is included only for the purposes of scaling, to convert the engineering units of y into normalized internal units as used by the model. In some embodiments, because $x_3$ appears only in products with the matrices $K_i$, L=I can be forced during training without any loss in expressive capability. This feature may allow the system to train the model in fully normalized units and then obtain the corresponding physical-units model via a simple affine transformation of the parameters including L.

In some embodiments, LSTM models may provide advantages over other types of models. For example, LSTM models may require a monolithic recurrent neural network, they can be completely data drive, and they may be considered more general.

Greybox Modeling

In some embodiments, as an alternative to the LSTM model, a Greybox model can also be defined that encodes knowledge of system structure. Overall, the model may include the one or more of the following four sub-models, a linear physics model, an LSTM disturbance model, a non-linear heating-controller model, and a simple nonlinear cooling-controller model. In some embodiments, the final two components have the same mathematical structure, but have different signs to account for heating versus cooling differences.

The purpose of the linear physics model may be to encode simple but fundamental heat-transfer relationships in the model primarily so that energy balances can be satisfied. For example, to reduce zone temperature, this model requires a corresponding active cooling input, whereas a blackbox model is unlikely to grasp this requirement. The model can be implemented as the discretization of the following two-state ordinary differential equation (ODE):

$$\frac{dT_z}{dt} = -k_{zm}(T_z - T_m) - k_{za}(T_z - T_a) + c_z f(T_{VAV} - T_z) + c_a Q_a \quad (10)$$

$$\frac{dT_m}{dt} = -k_{mz}(T_m - T_z)$$

Wherein the states are: the zone temperature $T_z$ (e.g., measurable) and the mass temperature $T_m$ (e.g., not measurable), and the inputs are: the ambient temperature $T_a$, the VAV flow rate $f$, and the disturbance heat load $Q_a$. The remaining quantities: $k_{zm}$, $k_{za}$, $c_z$, $T_{VAV}$, $c_a$ and $k_{mz}$ are all trainable parameters. In some embodiments, if the AHU supply temperature setpoint is known, $T_{VAV}$ could be converted to an input. In other embodiments and/or in the interest of flexibility, the system treats it as a trainable parameter. From Eq. 10, it can be identified that this model is linear in the states $T_z$ and $T_m$, which means it can be discretized exactly using matrix exponentials. However, because the input $f$ multiplies the state $T_z$, a new matrix exponential may need to be performed at each timestep to account for the new value of $f$, which can be computationally costly. As such, as an approximation, the following term is defined:

$$\tilde{Q} := c_z f(T_{VAV} - T_z) + c_a Q_a \quad (11)$$

wherein $\tilde{Q}$ is assumed to be an independent input. Thus, in matrix form, the equation can be presented as the following:

$$\frac{d}{dt}\begin{pmatrix} T_z \\ T_m \end{pmatrix} = \begin{pmatrix} -k_{zm}-k_{za} & k_{zm} \\ k_{mz} & -k_{mz} \end{pmatrix}\begin{pmatrix} T_z \\ T_m \end{pmatrix} + \begin{pmatrix} k_{za} \\ 0 \end{pmatrix} T_a + \begin{pmatrix} 1 \\ 0 \end{pmatrix} \tilde{Q} \quad (12)$$

This system can thus be discretized using the standard formulas, and for the purposes of calculating $\tilde{Q}$, we simply use the value of $T_z$ at the beginning of the interval. Given the relatively short sample time (5 min), this approximation is highly accurate, but note that accuracy deteriorates as the sample time increases. After discretizing:

$$x^+ = Ax + B_T T_a + B_Q \tilde{Q} \quad (13)$$

where $x := (T_z, T_m)$. The measurement function may then be defined as:

$$\hat{y} = Cx \quad (14)$$

for the measurement $y = (T_z)$ and matrix $C = (1\ 0)$. Finally, for the purposes of filtering, the "inverse" load function can be defined as:

$$Q^{-1}(x, y) = (CB_Q)^{-1}(y - Cx) \quad (15)$$

In some embodiments, the purpose of Eq. (15) function is to back-calculate the correction to $c_a Q_a$ from the previous step that would have made the predicted measurement $Cx$ exactly match the actual measurement $y$. In some embodiments, the biggest source of uncertainty in the model is the disturbance load $Q_a$, and so a reasonable starting point for filtering is to blame all of the model error on it. Thus have the overall filtering function may be defined as:

$$\check{x} = \hat{x} + B_Q Q^{-1}(\hat{x}, y) + L(y - C\hat{x}) \quad (16)$$

with L as a trainable parameter that can be used to slightly modify the resulting filter dynamics. The motivation for this approach can be that it is known that the closed-loop filtering system is stable for any $L \approx 0$ regardless of the other model parameters. Thus, by parameterizing the filter in this way, it can be retained throughout the course of training regardless of how far the model parameters move. Overall, the subscript p for "physics" can be used and the following variables can be defined:

$$x_p = (T_z, T_m)$$

$$u_p = (T_a, f_{VAV}, Q_a)$$

$$y_p = (T_z) \quad (17)$$

evolving as:

$$x_p^+ = f_p(x_p, u_p)$$

$$\check{x}_p = g_p(\hat{x}_p, y_p)$$

$$\hat{y} = h_p(x_p) \quad (18)$$

with $f_p(\cdot)$ defined by (13) and (14), $g_p(\cdot)$ defined by (17), and $h_p(\cdot)$ defined by (15).

In some embodiments, the purpose of the LSTM disturbance model is to predict the disturbance heat load $Q_a$ from the other inputs. It may essentially have the same form as the monolithic LSTM model. Using the subscript d for "disturbance", the following inputs and outputs can be defined for the LSTM disturbance model:

$$u_d = (T_a, \mathcal{C}, \mathcal{O}, T, d)$$

$$y_d = (Q_a) \quad (19)$$

with state $x_d$ having no semantic meaning as in the LSTM model. These variables can evolve to be defined as:

$$x_d^+ = f_d(x_d, u_d)$$

$$\check{x}_d = g_d(\hat{x}_d, y_d)$$

$$\hat{y}_d = h_d(x_d) \quad (20)$$

with $f_d(\cdot)$, $g_d(\cdot)$, and $h_d(\cdot)$ having the same form as $f^{LSTM}(\cdot)$ from Eq. (5), $g^{LSTM}(\cdot)$ from Eq. (7), and $h^{LSTM}(\cdot)$ from Eq. (5).

In some embodiments, a nonlinear controller model may be implemented in the Greybox model. Each controller (when active) that the system is attempting to model imposes discrete-time dynamics of the form:

$$T_z^+ = T_z + \alpha \tanh(\beta(T_{sp} - T_z)) + \gamma(Q_a - \overline{Q}_a) \quad (21)$$

wherein $T_{sp}$ is the temperature setpoint and $\overline{Q}_a$ is an exponential moving average of $Q_a$ calculated recursively as:

$$\overline{Q}_a^+ = \rho \overline{Q}_a + (1-\rho) Q_a \quad (22)$$

In some embodiments, $Q_a$ accounts for the fact that the controller cannot respond as quickly to abrupt changes in the disturbance heat load $Q_a$. In some embodiments, the remaining quantities $\alpha$, $\beta$, $\gamma$, and $\rho$ are all trainable parameters.

Within the overall model, two independent instances of this model are used, one for the heating controller and one for the cooling controller. Of course, only one of these controllers may be active at a given time, but that restriction can be accounted for in the supervisory model (described below). For the cooling controller, the subscript c for "cooling" is used and defines the following variables:

$$x_c = (T_z, \overline{Q}_a)$$

$$u_c = (T_{sp}, Q_a)$$

$$y_c = (T_z) \quad (23)$$

These quantities can evolve to be defined as:

$$x_c^+ = f_c(x_c, u_c)$$

$$\check{x}_c = g_c(\hat{x}_c, y_c)$$

$$\hat{y}_c = h_c(x_c) \quad (24)$$

in which $f_c(\bullet)$ is defined by (18) and (19), $g_c(\bullet)$ replaces the first component of $T_z$ with its measured value (leaving $\overline{Q}_a$ unaffected), and $h_c(\bullet)$ returning the first component of $x_c$. For the heating controller, the variables and equations can be exactly the same, but with the subscript h for "heating".

In some embodiments, the greybox model (e.g., greybox model 712, etc.) includes a supervisory sub-model (e.g., supervisory model). The supervisory model can be responsible for combining the various sub-models to produce an overall model with the required form. For this purpose, the overall state is simply the concatenation of the various sub-states, along with an extra "dummy" state for $f_{VAV}$. This can be defined as:

$$x := (x_p, x_d, x_c, x_h, f_{VAV}) \quad (25)$$

The extra state can be included to calculate $y = h(x)$ as a function only of $x$. In some embodiments, to advance the state, a predictor-corrector structure is essentially used in which the controller models' predictions are used to predict the next temperature, back-calculate the required VAV airflow that would be required to deliver those temperatures, and then correct the predictions using the physics model after accounting for appropriate bounds.

In some embodiments, the specific algorithm for this includes the following (i) compute the successor disturbance state $x_d^+ = f_d(x_d, u_d)$ and predict the disturbance load $Q_a = h_d(x_d^+)$ to use in $u_p$, $u_c$, and $u_h$, (ii) compute the hypothetical zero-flow physics successor state $\tilde{x}_p^+ = f_p(x_p, u_p)$ assuming $f_{VAV}=0$, (iii) compute the successor cooling-controller state $x_c^+ = f_c(x_c, u_c)$ and predict the hypothetical cooling temperature as $\tilde{T}_c^+ = h_c(x_c^+)$. (iv) If the cooling controller is inactive, set the cooling load to $\tilde{Q}_c=0$. Otherwise, back-calculate the cooling load as:

$$\tilde{Q}_c = \min(Q^{-1}(\tilde{x}_p^+, \tilde{T}_c^+), 0) \quad (26)$$

(v) Compute the successor state heating-controller state $x_h^+ = f_h(x_h, u_h)$ and predict the hypothetical heating temperature as $\tilde{T}_h^+ = h_h(x_h^+)$. (vi) If the heating controller is inactive, set the heating load to $\tilde{Q}_h=0$. Otherwise, back-calculate the heating load as:

$$\tilde{Q}_h = \max(Q^{-1}(\tilde{x}_p^+, \tilde{T}_h^+), 0) \quad (27)$$

(vii) Using the physics-model parameters, back-calculate the predicted flow as:

$$\tilde{f}_{VAV} = \frac{\tilde{Q}_c + \tilde{Q}_h}{c_z(T_{VAV} - T_z)} \quad (28)$$

(viii) Clip $\tilde{f}_{VAV}$ to its fixed bounds $f_{VAV}^{min}$ and $f_{VAV}^{max}$ to determine $f_{VAV}$, (ix) re-calculate $x_p^+ = f_p(x_p, u_p)$ using the computed value $f_{VAV}$ with the updated state:

$$x^+ = (x_p^+, x_d^+, x_c^+, x_h^+, f_{VAV}) \quad (29)$$

To filter the state, the process is relatively simple, except the fact must be addressed that the disturbance load for $Q_a$, which is needed by the various models, cannot actually be measured. Thus, an estimated value is instead substituted:

$$\tilde{Q}_a = h_d(\hat{x}_d) + \frac{1}{c_a} Q^{-1}(\hat{x}_p, y_p) \quad (30)$$

The sub-states $\hat{x}_p$, $\hat{x}_d$, $\hat{x}_c$, and $\hat{x}_h$ are then filtered to $\check{x}_p$, $\check{x}_d$, $\check{x}_c$, and $\check{x}_h$ via the individual filtering functions $g_p(\bullet)$, $g_d(\bullet)$, $g_c(\bullet)$, and $g_h(\bullet)$ assuming $Q_a = \tilde{Q}_a$. The remaining state $f_{VAV}$ is left untouched, as it does not need to be filtered.

Overall, the Greybox model can be defined as:

$$x^+ = f_\theta^{Greybox}(x, u)$$

$$\check{x} = g_\theta^{Greybox}(\hat{x}, y)$$

$$\hat{y} = h_\theta^{Greybox}(x) \quad (31)$$

with $f^{Greybox}(\bullet)$ given by the algorithm above, $g^{Greybox}(\bullet)$ given by the individual filtering equations (plus the estimation equation for $\tilde{Q}_a$), and $h^{Greybox}(\bullet)$ simply concatenating $T_z$ from the physics state $x_p$ with the dummy state $f_{VAV}$. The parameters $\theta$ are all of the parameters included in the various sub-models, along with the additional bound parameters $f_{VAV}^{min}$ and $f_{VAV}^{max}$, which can either be trained along with the other parameters or set to known fixed values.

Still referring to FIG. 5, the selected model is shown to be received by policy trainer 518, along with one or more constraints, one or more objective functions, and at least one selected control law. In some embodiments, policy trainer 518 is configured to generate a direct policy optimization based on the received data.

Policy trainer 518 may implement an optimal control framework that incorporates elements of both model-predictive control and model-based reinforcement learning. In some embodiments, the overall premise of model-based optimal control is to interrogate a dynamic model (e.g., the selected model) for the system of interest to choose an optimal sequence of control actions (e.g., selected control law) as indicated by a specified cost function (e.g., the received objective function). These models may predict the values of measured output variables in response to manipulated inputs (e.g., MVs) and exogenous disturbances (e.g., disturbance variables, etc.). In some embodiments, policy trainer 518 embeds the selected model in an offline optimization problem, wherein the tunable weights of a neural-network control law are adjusted to minimize the average value of the objective function over a large number of closed-loop system trajectories.

In some embodiments, the main steps performed by policy trainer 518 include estimating the system state throughout the training data using the obtained dynamic model, and training a control law by solving a DPO problem incorporating the trained state-space model.

For the purposes of modeling, a state-space framework of the DPO in policy trainer 518 in which the nominal system evolves can be defined:

$$x_{t+1}=f(x_t,u_t), \quad y_t=h(x_t) \tag{32}$$

for internal system states x, inputs u, and measured outputs y. In some embodiments, the control inputs are not differentiated (e.g., manipulated values chosen by the control system) from exogenous disturbances (e.g., values generated externally that affect the system). In some embodiments, $f(\cdot)$ is the state transition function and $h(\cdot)$ is the measurement function. For the purpose of state estimation, $\hat{x}$ is used to denote the predicted (e.g., the prior value before observing y) value of the state and $\check{x}$ to denote the filtered (e.g., posterior value after observing y). These quantities are related by:

$$\check{x}_t = g(\hat{x}_t, y_t) \tag{33}$$

making use of the filtering function $g(\cdot)$. Finally, when there is not an initial state estimate $\hat{x}$, an initialization function is used:

$$\hat{x}_t \approx E(y_t, u_t, y_{t+1}, \ldots, u_{t+N_E-1}, y_{t+N_E}) \tag{34}$$

to obtain an initial state estimate from $N_E$ steps of u and y data. The order $N_E=0$, may be chosen which corresponds to $\hat{x}_t \approx E(y_t)$. In any case, with this value, it can be iterated through $f(\cdot)$ and $g(\cdot)$ to advance the state estimate. Once the current time is reached, $f(\cdot)$ can be stepped by itself (i.e., short-circuiting to $\check{x}_t = \hat{x}_t$) to make future predictions.

To determine $f(\cdot)$, $g(\cdot)$, $h(\cdot)$, and $E(\cdot)$ for a particular system, the functions via a parameter vector $\theta$ are parameterized and then the numerical values of $\theta$ are adjusted so that the model's predictions match a training dataset as closely as possible. In some embodiments, this is performed by obtaining a historical dataset $u_t$, $y_t$, for $t \in \{0, \ldots, T\}$ and choosing a filtering horizon M and a prediction horizon N and solving the following optimization problem:

$$\min_{\theta, x_{kt}} \sum_{t=M}^{T-N} \sum_{k=0}^{N-1} \|y_{k+t} - h_\theta(x_{kt})\|^2 \tag{35}$$

$$\text{s.t.} \quad x_{0t} = E_\theta(y_t, u_t, \ldots, y_{t+N_E-1}, u_{t+N_E-1}, y_{t+N_E})$$

$$x_{(k+1)t} = \begin{cases} f_\theta(g_\theta(x_{kt}, y_{k+t}), u_{k+t}) & k \in \{0, \ldots, M\} \\ f_\theta(x_{kt}, u_{k+t}) & k \in \left\{ \begin{array}{l} M+1, \ldots, \\ M+N-1 \end{array} \right\} \end{cases}$$

Specifically, the total (or equivalently, average) squared prediction error may be minimized for T−M−N predicted trajectories, each N steps in length.

In the context of optimal control, a distinction can be made between two types of inputs. u can be made for the system inputs that are chosen by the control system (e.g., whose values we can directly manipulate) and define p as the external disturbances or parameters that affect the system or cost function but that do not get to control. With this definition, the state-space model becomes:

$$x_{t+1}=f(x_t,u_t,p_t), \quad y_t=h(x_t) \tag{36}$$

in which the u and p components have been explicitly separated of the monolithic input. The objective function can then be defined as:

$$J_N = \sum_{k=0}^{N-1} \ell(y_k, u_k, p_k) \tag{37}$$

$\ell(\cdot)$ may be referred to as the stage cost, which depends on the predicted inputs and outputs u, p, and y. Note here that the p vector may contain additional parameters that do not influence the dynamic model but instead define control objectives, e.g., a reference trajectory that the system is supposed to track, soft bounds on measured outputs, or time-varying cost parameters.

The overall goal is to construct a control law (AKA policy) so as to choose u in such a way that the objective function $J_N$ is minimized. To simplify notation, this control law is defined as:

$$u_t = \kappa(x_t, r_t) \tag{38}$$

giving the chosen control action as a function of the current system state x and a so-called "setpoint" vector r. This new quantity encapsulates all of the current and future information needed by (or available to) the control law to choose its current control action. For example, when it comes time to choose u, there may be access to multi-step forecasts $\hat{p}_t$ (i.e., predicted future values of $p_t$), which gives:

$$r_t := (p_t, \hat{p}_{t+1}, \ldots, \hat{p}_{t+N_r-1}) \tag{39}$$

for a given forecasting horizon $N_r$. Indeed, this is precisely the definition of the setpoint vector required for an MPC policy with horizon $N_r$. However, in the general case, there is much more flexibility here. For example, r could be defined to use only a short forecast, which would potentially reduce the proactivity of the control law but would avoid making the law overly-reliant on inaccurate longer-horizon forecasts. In some embodiments, r could be included only the quantities specifically related to the cost function, which means the policy would need to hedge against many possible disturbance realizations, as it no longer has access to a specific predicted sequence.

In any case, after choosing which quantities to include in the setpoint r, the next step is to define a policy function $\kappa(\cdot)$. For many techniques including MPC and RL algorithms based on Q-learning, the policy function is defined implicitly, i.e., as the output of some more complicated algorithm that may require a data-dependent or otherwise variable number of mathematical operations. For example, in MPC, $\kappa(\cdot)$ is defined as the solution to an optimization problem, and the number of iterations (and thus also the amount of time) required to find the optimal solution can vary significantly across problem instances. In contrast to these strategies, DPO chooses to parameterize the control law as an explicit function in the form of a parameterized neural network. For this step, there is a significant amount of flexibility, as will be discussed in Section 4. Regardless of its specific functional form, this object is denoted as $\kappa_\psi(x, r)$ to indicate the dependence on a set of numeric parameters $\psi$. The goal then becomes choosing the value of $\psi$ such that the average cost (6) over some chosen state distribution is minimized. To accomplish this goal, there is a fairly simple-minded but powerful approach: choose a representative sample of starting states, parameter forecasts, and setpoints; then, optimize $\phi$ by minimizing the finite-horizon cost function (6) starting from each of the chosen starting states. Mathematically, the optimization problem is as follows:

$$\min_\psi \quad L(\psi) := \frac{1}{T}\sum_{t=0}^{T-1}\left(\sum_{k=0}^{K-1}\ell(y_{kt}, u_{kt}, p_{kt})\right) \tag{40}$$

$$\text{s.t.} \quad x_{(k+1)t} = f(x_{kt}, u_{kt}, p_{kt})$$

-continued $$y_{kt} = h(x_{kt})$$

$$u_{kt} = \kappa_\psi(x_{kt}, r_{kt})$$

$$x_{0t}, r_{kt}, p_{kt} \text{ given}$$

In essence, the cost function is the average cost across T parallel optimal control problems, each with a finite horizon of K steps. The index $t \in \{0, \ldots, T-1\}$ denotes the different parallel trajectories, while $k \in \{0, \ldots, K-1\}$ gives the time point in the current trajectory. Given the structure of (9), this problem is solved via stochastic gradient algorithms, which each value of t being a different "sample" for the DPO algorithm. Specifically, at each iteration, the optimizer chooses only a small number of indices t to evaluate the gradient of the cost function dL/dψ. The incumbent parameters ψ are updated in the direction of that gradient, and the algorithm continues until some specified termination criteria is satisfied (usually a finite number of iterations). At this point, the optimized values can be fixed of ψ and deploy the policy on the real system.

For the DPO optimization problem (9), the "training data" consists of the initial states $x_{0t}$ (one for each trajectory t) as well as the setpoints $r_{kt}$ and the parameters $p_{kt}$ (one for each trajectory t and time point k). The goal is for all of these values to be representative samples of the values that would be encountered in online optimization, and thus historical data is the best place to find them. Now, as discussed in Section 2.1, historical data reflects u, p, and y, while r is free to be defined in terms of p or other computed values. Thus, x must be obtained via state estimation as will be described next.

Now, suppose there is access to a single contiguous "experiment" run on the system, consisting of T' consecutive time points indexed $t' \in \{0, \ldots, T'-1\}$. Now, to obtain an estimate of the system's state $\hat{x}$ at time $t'=0$, the state initialization function E(•) as in (3) using the first $N_E$ samples of the experiment can be applied. However, given that this mapping tends to be very simple and is intended only as a rough starting point, these values should not be used directly. Instead, M can be iterated times through the filtering function g(•) and the system evolution equation $f(•)$ as in (2) and (1) respectively to find the (filtered) state estimate $\hat{x}$ for $t'=M$. This value is then defined as $x_{0t}$ for t=0. In some embodiments, a filtered state estimate may not be used $\check{x}$ as, even though it is technically more representative of the system's true state, it may have a significantly different distribution than its unfiltered counterpart, which can cause some troublesome behavior. With this initial state $x_{0t}$, the system can take the next K values of $p_t$ and $r_t$ to fill out $p_{kt}$ and $r_{kt}$ for this first t=0 sample.

Assuming there is some data remaining in the experiment, additional DPO samples can be obtained by sliding the horizon forward by one timestep and repeating the process. Specifically, E(•) can be applied starting from $t'=1$, iterate filtered steps M times to give $\hat{x}$ at time $t'=M+1$, and use this as $x_{0t}$ for t=1, with K-step windows for $p_{kt}$ and $r_{kt}$. This process repeats until the data is exhausted in the current experiment. From this process, M steps can be lost at the beginning of the experiment for filtering, K−1 steps at the end for the DPO horizon, and an additional $N_r-1$ steps at the end to obtain the full forecast needed by the final r. Thus, from a T'-step experiment of u, y, and p data, $T=T'-M-K-N_r+2$ samples are obtained for DPO. If the training data consists of separate non-consecutive experiments, then this procedure can be applied to each separate experiment, but $M+K+N_r-2$ data points from each experiment can be lost.

Once the policy has been trained, it needs to be deployed on the real system. Thus, a value of x and r is required at each timestep where the policy is evaluated, and these values can be obtained exactly in the case of the training data. Specifically, assuming the current time is t, we load historical u, y, and p data spanning $t' \in \{t-M, \ldots, t-1\}$, and apply the same filtering procedure as above to obtain $\hat{x}_t$ to use as input to the network. After constructing $\hat{r}_t$ by combining the appropriate, $u_t := \kappa_\psi(\hat{x}_t, r_t)$ can be evaluated. If the current value of u is the only requirement, then the process is finished. However, in many cases, it is desirable to obtain a short horizon of u values to use either for display purposes or as a fallback in case communication becomes corrupted. Thus, after obtaining forecasted values for $\hat{p}_t$ and $\hat{r}_t$ into the future for as many timesteps as desired, the system state as $\hat{x}_{t+1} = f(\hat{x}_t, u_t, \hat{p}_t)$ can be advanced, compute the second input $\hat{u}_{t+1} = \kappa(\hat{x}_{t+1}, \hat{r}_{t+1})$, and repeat as desired. For these future steps, the unfiltered model can be used (i.e., skipping application of g(•)) values of the measurements $y_{t+1}, y_{t+2}$, are lacking etc., that will only realize in the future. Given that disturbances may affect the system and cause its trajectory to deviate from the multistep predictions, it is thus desirable to re-evaluate the policy at a regular frequency using up-to-date measurements, but how often this process needs to occur is system-dependent.

Finally, note that in cold-start situations where there may not be sufficient historical data, a simple rule-based control law can be deployed for $\kappa_\psi(•)$ to use in the interim and then perform DPO after enough data is acquired. Policy trainer 518 is shown to provide the DPO control sequence to control framework selector 524.

Control framework selector 524 may be configured to compare the accuracy of the currently implemented control framework with the newly retrained control framework to determine if controller 502 should switch to the new control framework. The original control framework can include the framework implemented by rule-based controller 512 prior to receiving training data, or can include an already-implemented DPO framework (e.g., one that implemented an LSTM model, etc.). Control framework selector 524 may be configured to determine the best control framework to implement and provide that control framework to online controller 526 for online implementation.

Online controller 526 may be configured to perform online control of the building zone using the received optimal control framework. In some embodiments, the online controller 526 operates online, which the preparation, training, and/or generation of the DPO control framework is performed offline. As such, online controller 526 may be performing at relatively low computational power, as no training needs to occur during online implementation. Online controller 526 is configured to provide control signals to HVAC equipment 527.

Figure 6:
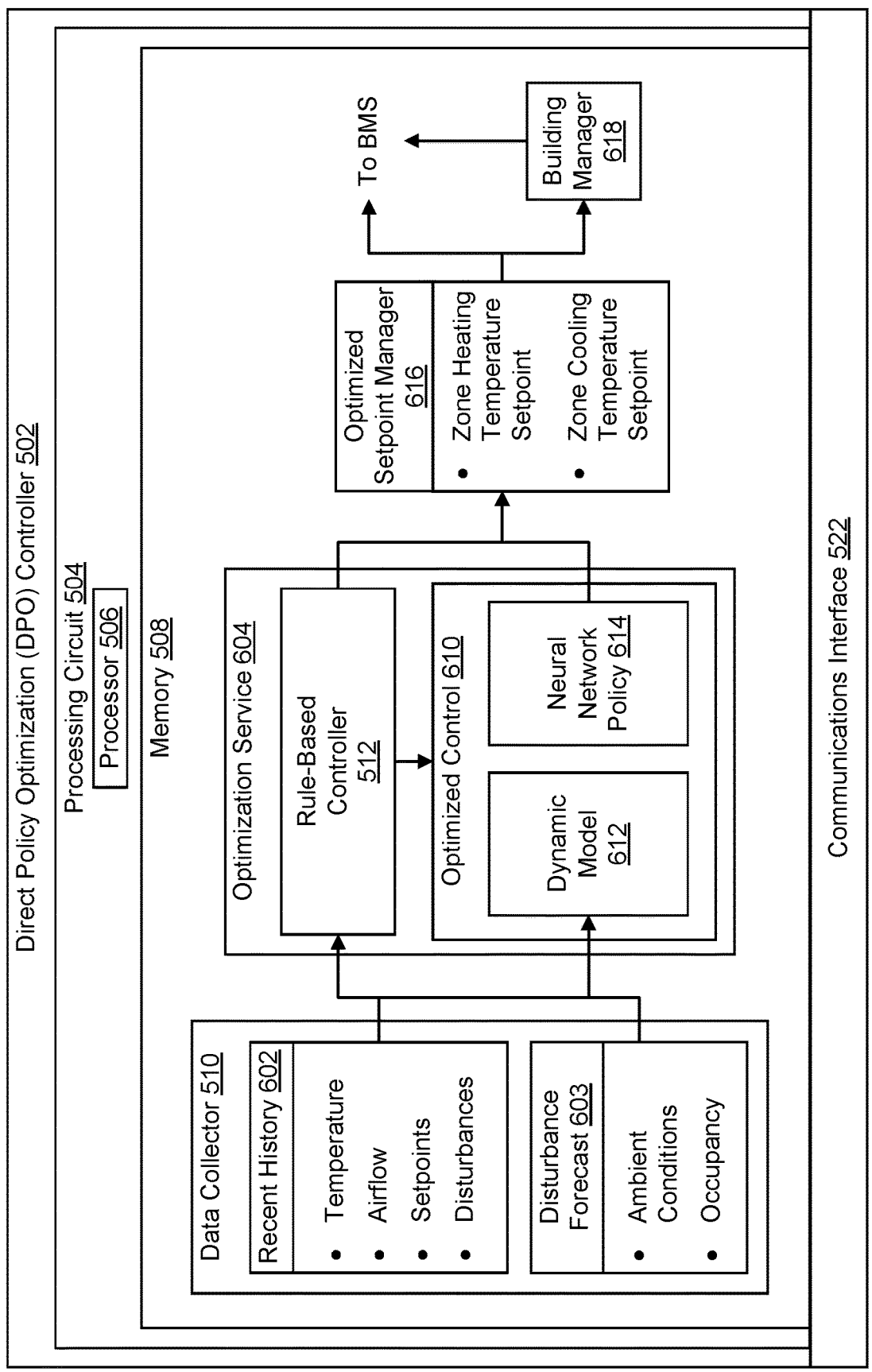
FIG. 6 is a block diagram of a DPO solution architecture, which can be implemented by the controller of FIG. 5, according to some embodiments.

Referring now to FIG. 6, another block diagram of controller 502 is shown, according to some embodiments. Controller 502 as shown in FIG. 6 is shown to include data collector 510 including recent history 602, disturbance forecast 603, optimization service 604, optimized control 610 including dynamic model 612 and neural network policy 614, optimized setpoint manager 616, and building manager 618.

In some embodiments, DPO architecture (e.g., the systems and methods performed by optimization service 604 and/or policy trainer 518, etc.) requires three main components for each building zone: a dynamic model, a control law, and a cost function. In some embodiments, the same problem is being solved for multiple building zones (e.g., multiple rooms, etc.). Thus, the cost function may be the same across all rooms. The remaining two items can be produced by the DPO training process (e.g., dynamic model trainer 514, etc.), which can require at least a modest amount of training data (e.g., two weeks, etc.) and improves in performance as more data becomes available. In some embodiments, upon initial deployment, such training data is generally unavailable, and so neural-network policy functions cannot be used. Given this limitation, a default rule-based policy (e.g., the methods performed by rule-based controller 512, etc.) can be defined with a small number of parameters that can easily be configured to provide adequate control performance for a given space. This default policy can serve several purposes. For example, it is able to provide immediate benefit to the space by capturing most of the available cost savings. In another example, it induces sufficient setpoint excitation in the space so that the resulting operational data is useful for eventual model and policy training.

In some embodiments, the deployment architecture of the proposed solution is illustrated in FIG. 6. In some embodiments, as input data, optimization service 604 receives a recent zone history 602 (e.g., used for state estimation purposes, etc.) and a future disturbance forecast 604 (e.g., used to simulate the model and evaluate the control law, etc.). Internally, the algorithm (e.g., online controller 526, etc.) uses the default rule-based control algorithm when first deployed, as there is no data available for model and policy training. After this policy has been used for a sufficient amount of time (e.g., one to two months), the collected operating data can then be used to fit a dynamic model 612 and optimize a control law. Once adequate accuracy and performance has been achieved, the optimization service 604 can internally switch to the optimized control 610 to provide better performance. From this point onward, the dynamic model 612 and neural-network policy 614 can be continuously retrained (e.g., every two weeks or once per month, etc.) to ensure adaptation to changes in building operation. In addition, if there is a significant and abrupt change in how the building operates (e.g., at the transition from heating to cooling season, etc.), the optimization service 604 can transition back to the default rule-based control law until sufficient data in the new operating mode is available. Overall, both the rule-based and optimized control algorithms can produce the same optimized setpoints, and thus the input/output structure of the optimization service 604 remains constant throughout deployment. In some embodiments, from an integration perspective, the transition from one policy to another is relatively seamless.

Figure 7:
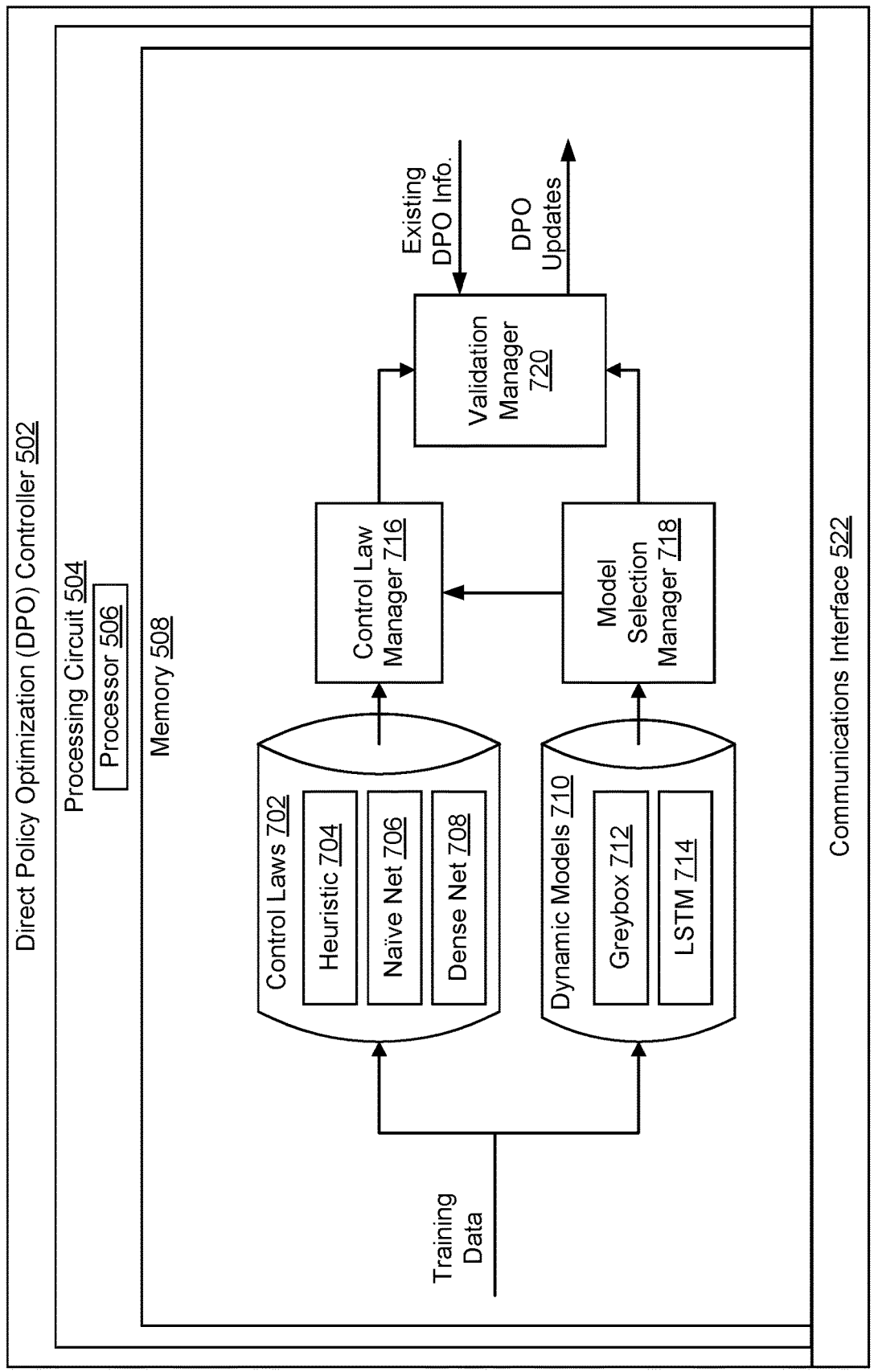
FIG. 7 is a block diagram of a dynamic model and control law training in a DPO solution, which can be implemented by the controller of FIG. 5, according to some embodiments.

Referring now to FIG. 7, another block diagram of controller 502 is shown, according to some embodiments. Controller 502 as shown in FIG. 7 may display the general relationship between validation manager 720 and the selected features (e.g., the selected model, the selected control law, etc.) of the online control policy. Memory 508 of controller 502 is shown to include control laws database 702, including heuristic control 704, naïve network 706, dense network 708, dynamic models database 710, including greybox model 712 and LSTM model 714, control law manager 716, model selection manager 718, and validation manager 720. In some embodiments, the optimization service (e.g., the systems and methods performed by validation manager 720, etc.) is queried at least once per day (e.g., or whenever there is a change to the occupancy schedule, etc.), but is designed to allow querying as often as necessary. By contrast, the training routine can be activated at a slower frequency (e.g., only as often as necessary to keep models accurate, such as every two weeks to every month).

Figure 8:
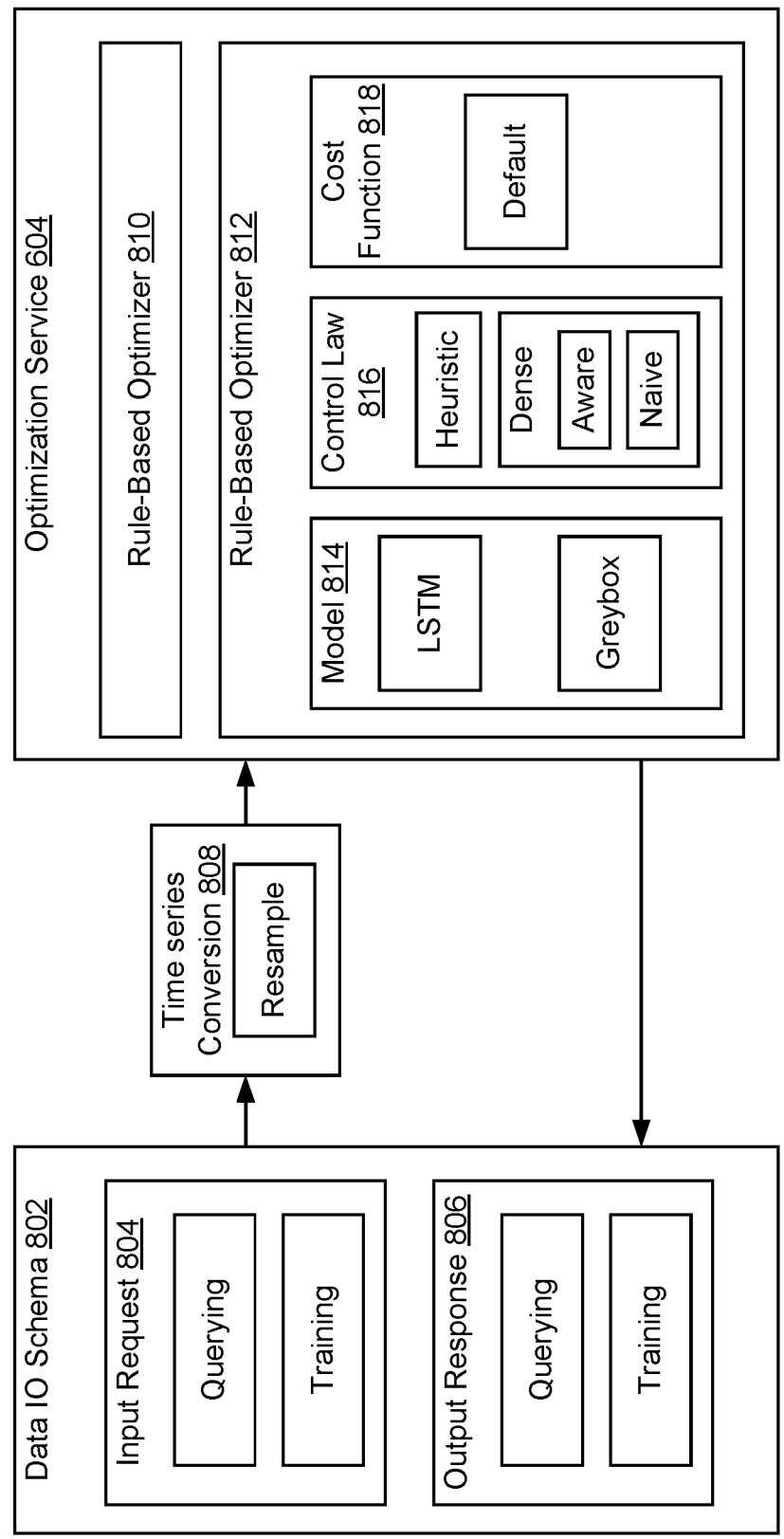
FIG. 8 is a block diagram of a DPO solution architecture, which can be implemented by the controller of FIG. 5, according to some embodiments.

Referring now to FIG. 8 another block diagram of controller 502 is shown, according to some embodiments. FIG. 8 is shown to include data IO schema 802, input request 804, output response 806, time series conversion 808, optimization service 604, rule-based optimizer 810, rule-based optimizer 812, model 814, control law 816, and cost function 818. In some embodiments, the system as shown in FIG. 8 is configured to display one embodiment of the overall structure of DPO control performed by controller 502.

Training data (e.g., including measured inputs and outputs of the system) may be provided and used to train both dynamic models 710 and the control laws 702. These different types of control laws and/or dynamic models generally trade off generality and data requirements (e.g., with the most general types requiring the most training data to achieve good performance, etc.), and so as part of the training process, multiple model types can be tried and the one with the best accuracy is chosen. After training both control laws 702 and dynamic models 710, performance is compared against the existing model and control law (e.g., rule-based heuristic controller 512, etc.) as a final check before deployment. If suitable, the updated model and policy are then used in subsequent calls to the optimization service as shown in FIG. 5.

An optimization application programming interface (API) can receive recent zone history, future disturbance forecast, and future comfort bounds (e.g., from data collector 510, etc.) to return future setpoint sequence. The structure can be agnostic to underlying policy type, and the control schema can be defined and implemented. In some embodiments, the endpoint is exposed (e.g., to an integration team, etc.) using default rule-based policy. Additionally, a training API can receive zone historical data (e.g., from data collector 510, etc.) to train model 814 and optimize policy (e.g., one of the control laws 816). In some embodiments, a draft schema can be proposed, but not implemented.

In some embodiments, Greybox models (e.g., hybrid Greybox models, etc.) may have advantages over other types of modes. For example, Greybox models may combine recursive neural network (RNN) and liner models, may assume certain structures for hat transfer, can extrapolate well, and may require relatively low amounts of training data.

Control Framework Processes

Figure 9:
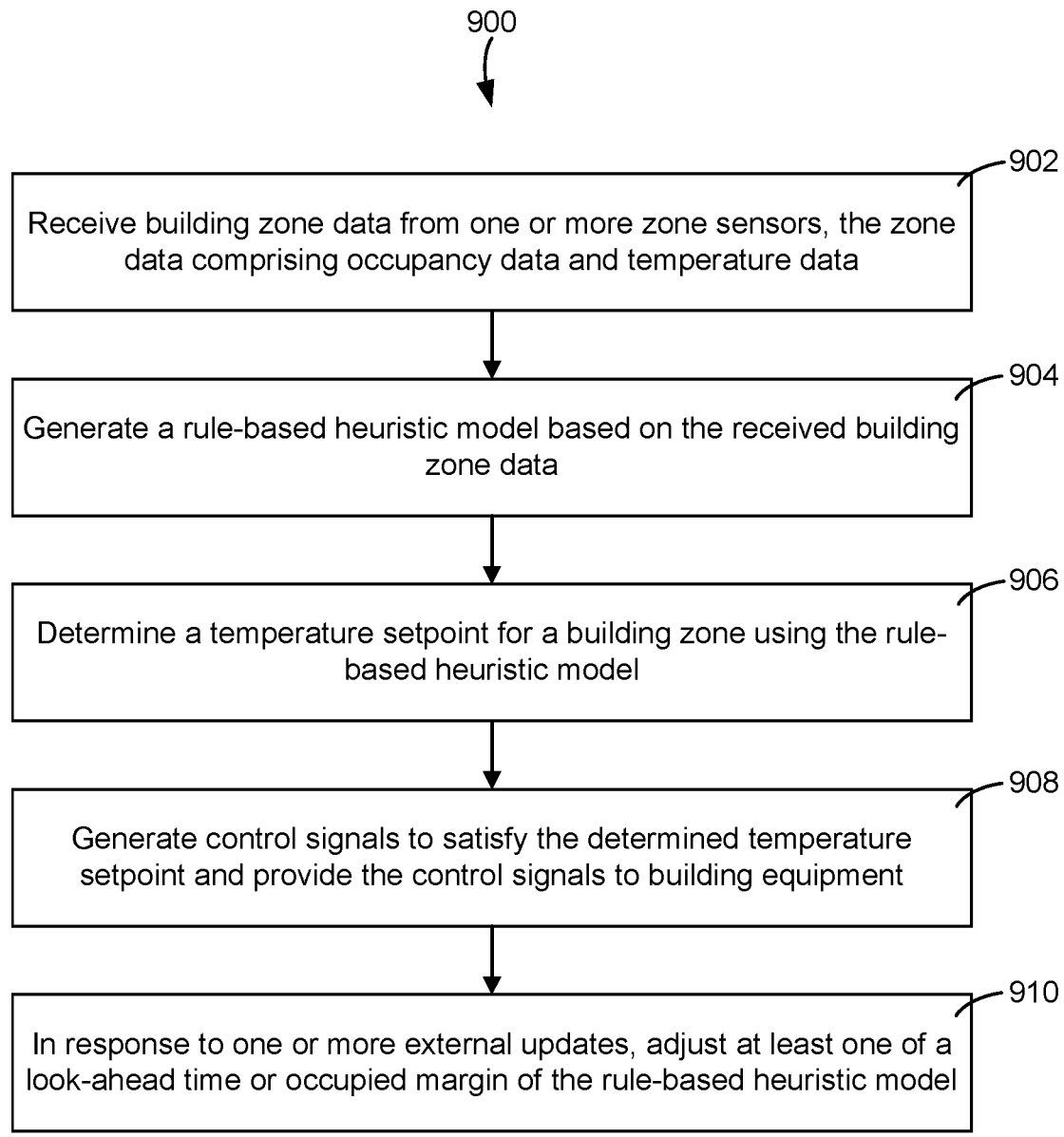
FIG. 9 is a flow diagram of a process for replacing a model-based control framework for a control system, which can be performed by the controller of FIG. 5, according to some embodiments.

Referring now to FIG. 9, a flow diagram of a process for replacing a model-based control framework for a control system is shown, according to some embodiments. Process 900 can be performed by any of the processing circuitry described and disclosed herein. For example, process 900 may be performed at least in part by controller 502.

Process 900 is shown to include receiving building zone data from one or more zone sensors, the zone data comprising occupancy data and temperature data (step 902). In some embodiments, sensors 524 provide real-time data to data collector 510 such that the data can be used for training purposes, such as state data for predictive modeling (e.g., the methods and operations performed by policy trainer 518, etc.) or a combination thereof. Data collector 510 may also receive historical data (e.g., data from previous states, etc.) from one or more databases. In some embodiments, these sets of historical data can include CV, MV, and DV information related to the operation and/or monitoring of the building zone, such that the component that used the historical data for training purposes (e.g., dynamic model trainer 514, etc.) can learn whether their predictions are accurate, as the data includes the actual CV data.

Process 900 is shown to include generating a rule-based heuristic model based on the received building zone data (step 904) and determining a temperature setpoint for a building zone using the rule-based heuristic model (step 906). In some embodiments, process 904 is showing a method for replacing a rule-based heuristic model with a more efficient model, when the system (e.g., controller 502) receives sufficient training data. Rule-based controller 512 may be configured to perform relatively simple predictive control, by implementing a determined look-ahead time ($\Delta$) and occupied margin ($\in$). The rule-based heuristic controller 512 may determine the setpoint for the building zone based on comfort levels and/or the occupancy schedules associated with the building zone (e.g., meeting room, etc.). For example, after having a meeting, the users may be prompted (e.g., via an application on their phone, via the display in the meeting room, etc.) to indicate how the temperature was in the room. The meeting attendees can provide their comfort data and the rule based heuristic controller 512 can process this data to adjust the parameters (e.g., $\Delta$ and $\in$, etc.).

Process 900 is shown to include generating control signals to satisfy the determined temperature setpoint and provide the control signals to building equipment (step 908). In some embodiments, online controller 526 may provide control signals to HVAC equipment 527 using the rule-based controller 512. While online controller 526 is shown to be using a control sequence from policy trainer 518 in FIG. 5, online controller 526 can also implement control sequences from rule-based controller 512, but can switch to control via policy trainer 518 (e.g., DPO control, etc.).

Process 900 is shown to include, in response to one or more external updates, adjustment of at least one of a look-ahead time or occupied margin of the rule-based heuristic controller 512 (step 910). In some embodiments, once there is sufficient data to train dynamic model trainer 514 or once there is sufficient data for the models of dynamic models 516 to be predicting accurate CVs, the control framework selector 524 may switch from implementing the control sequence of rule-based controller 512 to implementing the control sequence of policy trainer 518, which can include the direct policy optimization disclosed in detail above, with reference to FIG. 5.

Figure 10:
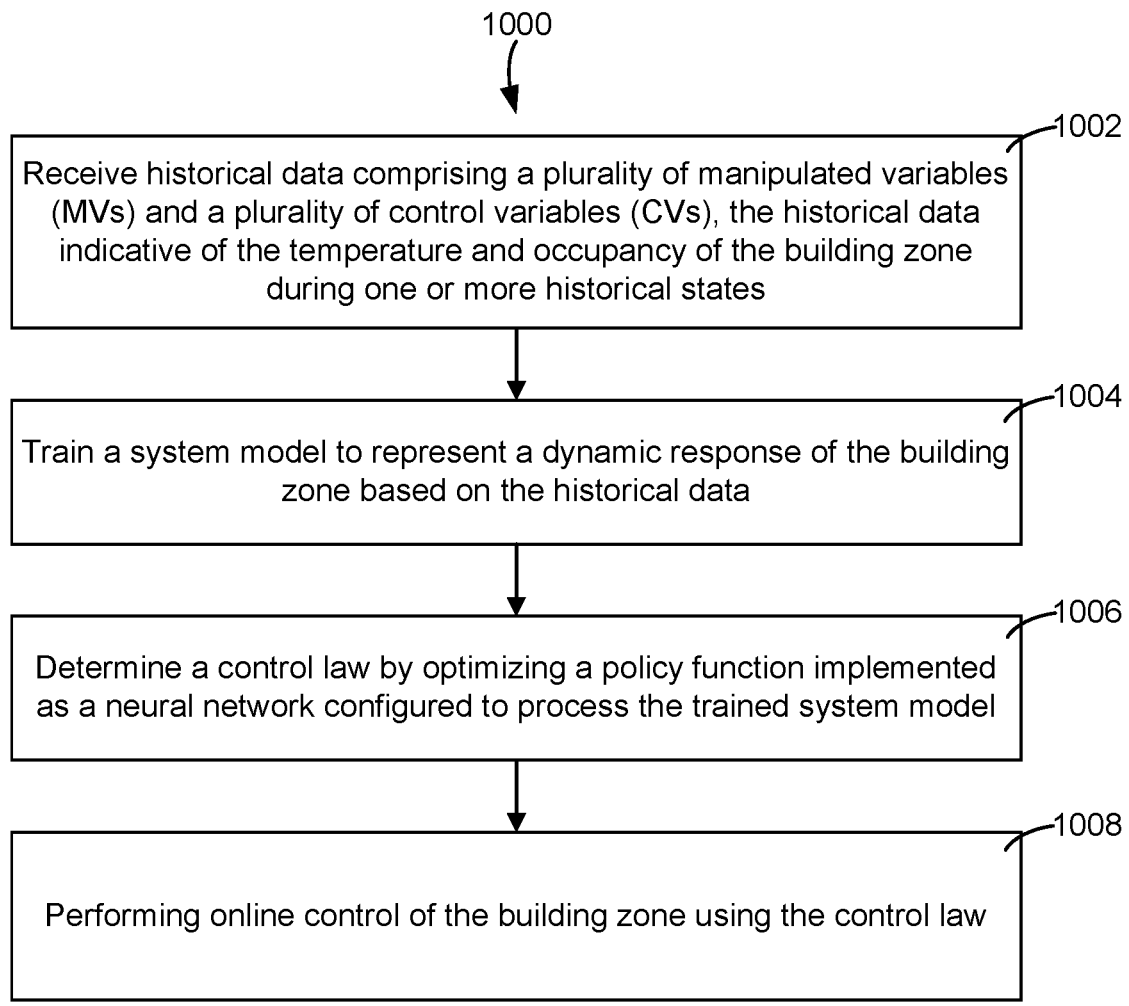
FIG. 10 is a flow diagram of a process implementing a model-based control framework for a control system, which can be performed by the controller of FIG. 5, according to some embodiments.

Referring now to FIG. 10, a flow diagram of a process implementing a model-based control framework (e.g., a system model) for a control system is shown, according to some embodiments. Process 1000 can be performed by any of the processing circuitry described and disclosed herein. For example, process 1000 may be performed at least in part by controller 502.

Process 1000 is shown to include receiving historical data comprising a plurality of manipulated variables (MVs) and a plurality of control variables (CVs), the historical data indicative of the temperature and occupancy of the building zone during one or more historical states (step 1002). In some embodiments, sensors 524 provide real-time data to data collector 510 such that the data can be used for training purposes, as state data for predictive modeling (e.g., the methods and operations performed by policy trainer 518, etc.) or a combination thereof. Data collector 510 may also receive historical data (e.g., data from previous states, etc.) from one or more databases. In some embodiments, these sets of historical data can include CV, MV, and DV information related to the operation and/or monitoring of the building zone, such that the component that used the historical data for training purposes (e.g., dynamic model trainer 514, etc.) can learn whether their predictions are accurate, as the data includes the actual CV data.

Process 1000 is shown to include train a system model to represent a dynamic response of the building zone based on the historical data (step 1004). Dynamic model trainer 514 may generate and/or train one or more dynamic models that are configured to model the dynamic response of the building zone. This can include predicting a preferred temperature in a historical time period t+1 based on the preferred comfort levels (e.g., preferred temperatures, etc.) of the occupants of the building zone, the delay in achieving a preferred setpoint, and other external factors (e.g., heat from sunlight, etc.).

Process 1000 is shown to include determining a control law by optimizing a policy function implemented as a neural network configured to process the trained system model (step 1006). Policy trainer 518 can be configured to receive the selected model and generate a control law using the policy trainer 518 to satisfy an objective function. In some embodiments, this includes minimizing the average value of a cost function based on predicted outputs of the system model.

Process 1000 is shown to include performing online control of the building zone using the control law (step 1008). The selected model may be provided to a neural network that is configured to perform direct policy optimization using the selected model. In some embodiments, MV adjustments (e.g., control signals provided to equipment) are determined based on CV predictions made by the selected model and one or more constrains of the generated (or received) objective function. Online controller 526 may receive the DPO control framework and perform control of the building zone by providing control signals to HVAC equipment 527. In some embodiments, the online control using the DPO framework can be performed at relatively low computational power, as the training of the framework was performed offline.

Figure 11:
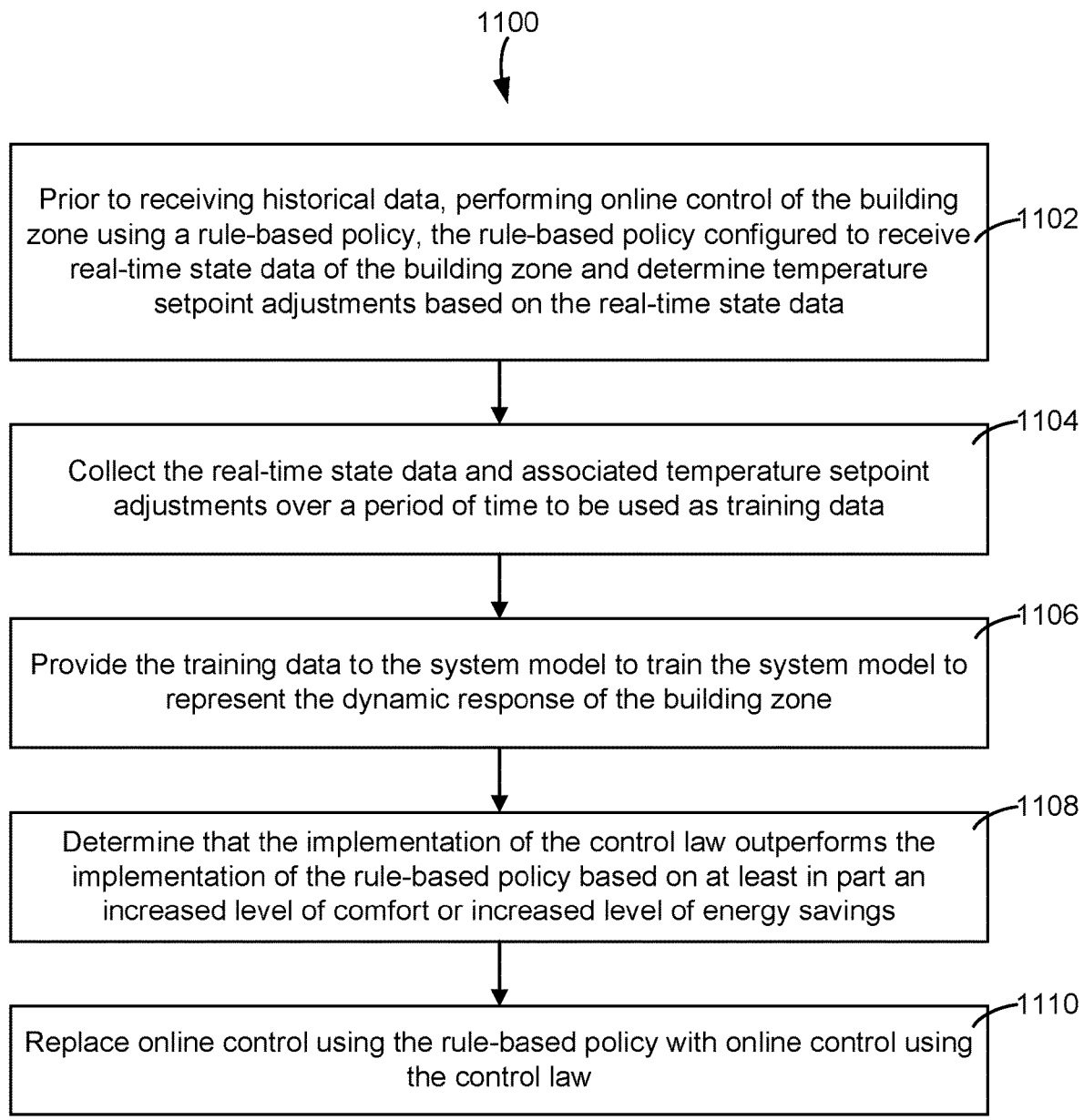
FIG. 11 is a flow diagram of a process for implementing a model-based control framework for a control system, which can be performed by the controller of FIG. 5, according to some embodiments.

Referring now to FIG. 11 a flow diagram of a process for implementing direct policy optimization using a neural network based on a dynamic model is shown, according to some embodiments. Process 1100 can be performed by any of the processing circuitry described and disclosed herein. For example, process 1100 may be performed at least in part by controller 502.

Process 1100 is shown to include prior to receiving historical data, performing online control of the building zone using a rule-based policy, the rule-based policy configured to receive real-time state data of the building zone and determine temperature setpoint adjustments based on the real-time state data (step 1102). Process 1100 is shown to include collecting the real-time state data and associated temperature setpoint adjustments over a period of time to be used as training data (step 1104). Process 1100 is shown to include providing the training data to the system model to train system model to represent the dynamic response of the building zone (step 1106). Process 1100 is shown to include determining that the implementation of the control law outperforms the implementation of the rule-based policy based on at least in part an increased level of comfort or increased level of energy savings (step 1108). Process 1100 is shown to include replacing online control using the rule-based policy with online control using the control law (step 1110).

Process 1100 may be similar to process 900 except for process 1100 discloses that the real-time state data is provided to dynamic model trainer 514 to be used as training data. This can allow dynamic model trainer 514 to accurately train several models using legitimist and recent data of the building zone. In some embodiments, the training data can include several sets of data spanning any reasonable timeline (e.g., 2 weeks, 2 months, 2 years, etc.).

Control Framework Diagrams

Figure 12:
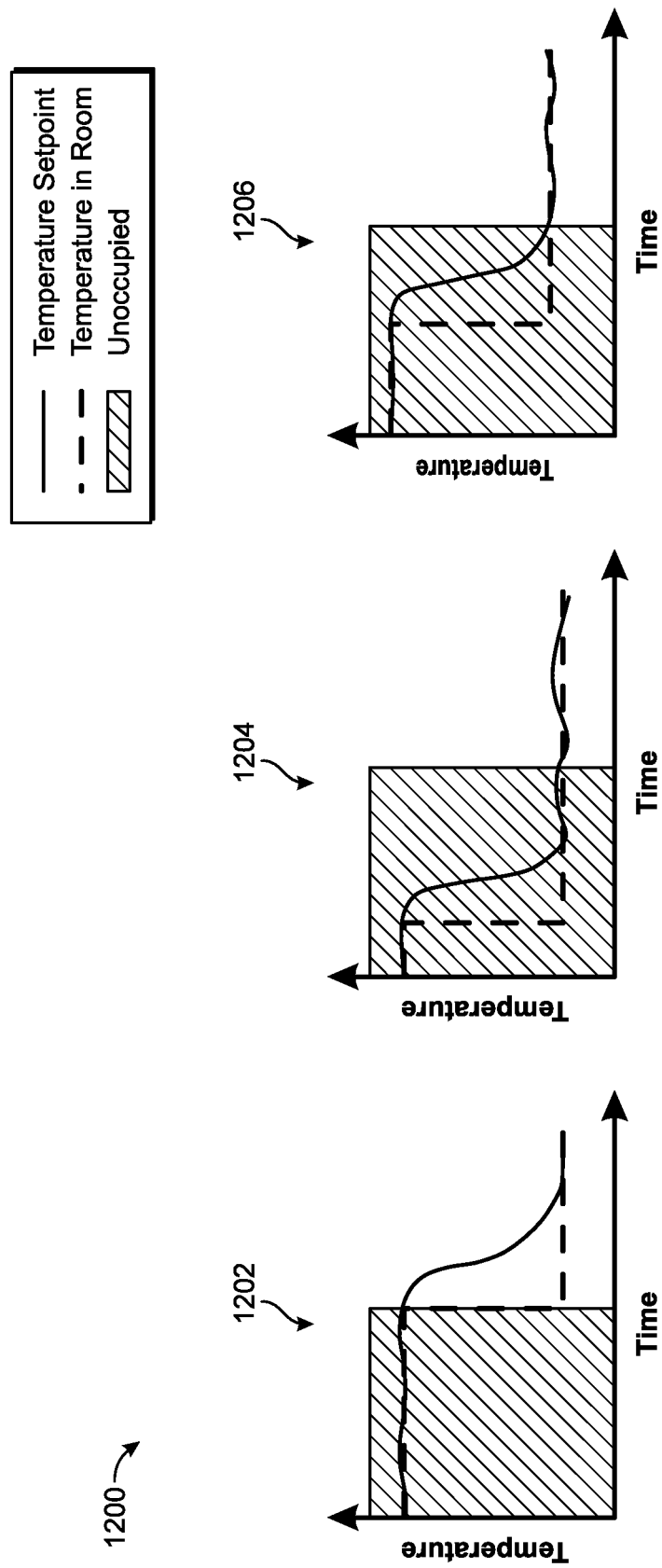
FIG. 12 is a diagram of relationships between temperatures and temperature setpoints, according to some embodiments.

Referring now to FIG. 12, a diagram 1200 for showing the relationship between temperature setpoints, the actual temperature, and the occupied space in a building zone is shown, according to some embodiments. Diagram 1200 is shown to include graphs 1202, 1204, and 1206. Graph 1202 may show an embodiment where control signals are provided to reach a setpoint too late, and the temperature in the room (e.g., the building zone) is higher than it should be (e.g., based on comfort levels or energy efficiency, etc.). As such, the temperature is high throughout the unoccupied space and continues to be slightly higher during the occupied space of the building zone.

Graph 1204 shows an embodiment where control signals are provided to equipment to reach a setpoint too early. As shown in graph 1204, the temperature begins to decrease during the unoccupied space and completes the setpoint adjustment prior to the space reaching occupation (e.g., prior to meeting attendees entering a room for a meeting, etc.). As such, the temperature can be considered too cool during the entirety of the occupied time, and result in decreased energy savings.

Graph 1206 shows an ideal embodiment where control signals are provided at the ideal time, such that comfort levels can be maintained in the building zone, but the temperature is not decreased so early such that energy savings are significantly decreased. Graph 1206 shows that control signals are provided to equipment to decrease the temperature setpoint near the end of the unoccupied time. Thus, the measured temperature has time to begin decreasing, and continue decreasing during the duration of the occupied space of the building zone.

Figure 13:
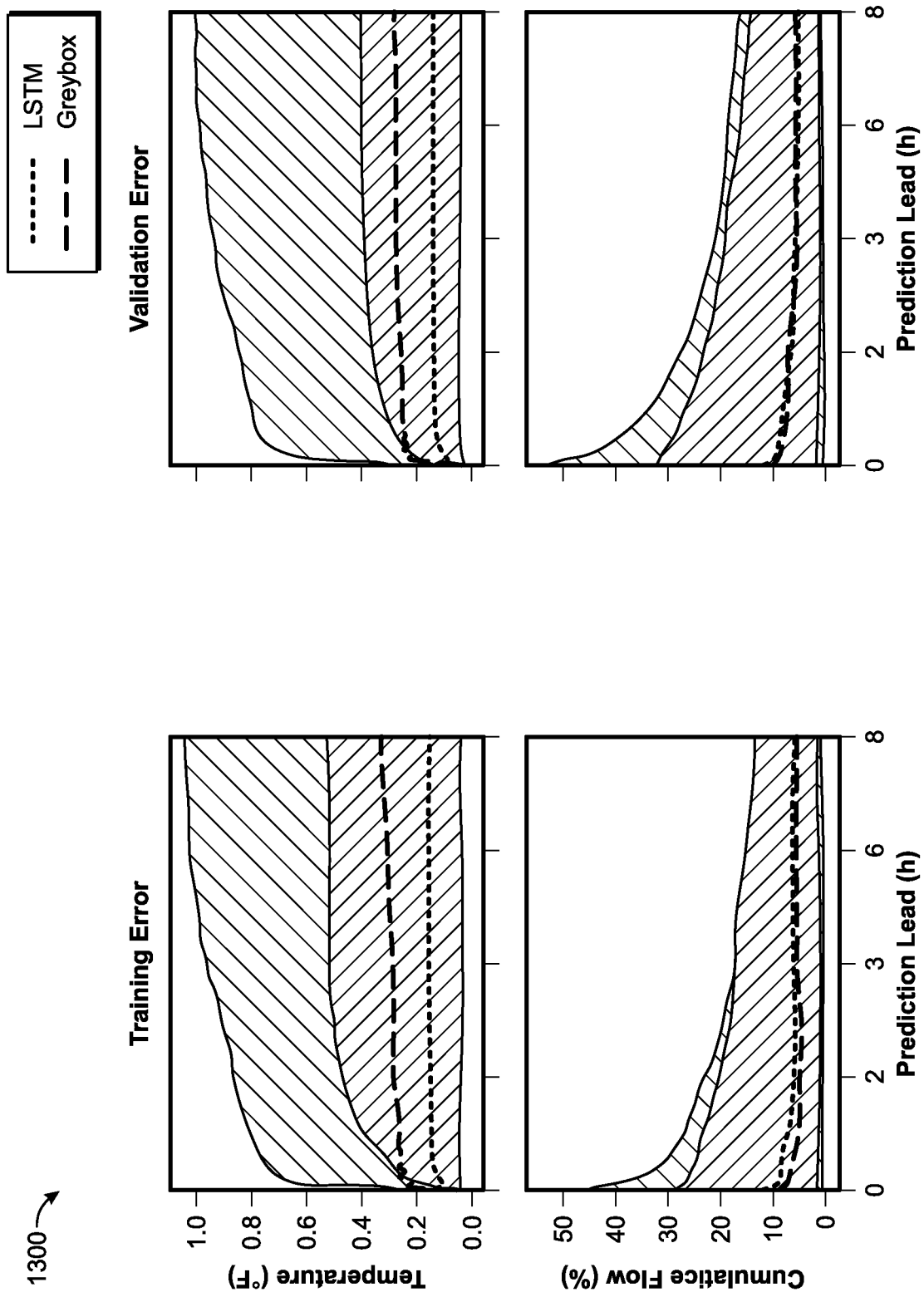
FIG. 13 is a diagram of training error and validation error in training predictive models, which can be implemented in the controller of FIG. 5, according to some embodiments.

Referring now to FIG. 13, a diagram 1300 for showing the error between dynamic models when performing temperature control in a building zone is shown, according to some embodiments. In some embodiments, the lines show the 50$^{th}$ percentile prediction error of the various models (e.g., LSTM model, Greybox model, etc.) with the shaded region showing the 10$^{th}$ to 90$^{th}$ percentiles. In some embodiments, the LSTM model may fit within the training data better, while the Greybox model extrapolates the data more efficiently.

Figure 14:
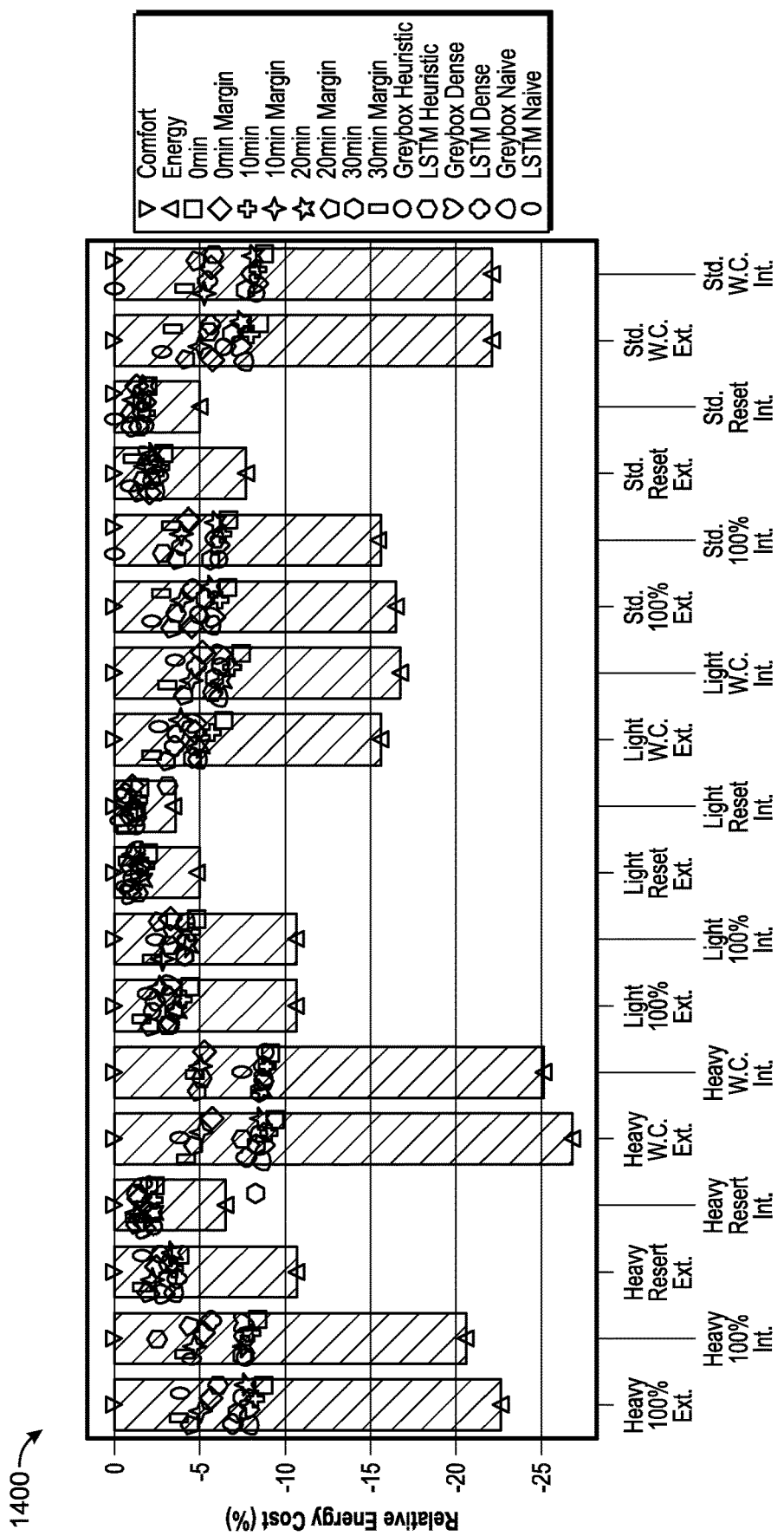
FIG. 14 is a diagram of comfort levels in a building zone, which can be implemented in the building of FIG. 1, according to some embodiments.

Referring now to FIGS. 14, a diagram 1400 for showing a case study for energy savings is shown, according to some embodiments. Diagram 1400 shows the potential savings of implementing the systems and methods disclosed herein. Diagram 1400 includes a graph that shows the relationship between relative energy cost (%) (y-axis) vs. Instances (.) (x-axis). The implementations of several types of models (e.g., LSTM Heuristic, Greybox Naïve, etc.) and their respective energy savings are shown. Of course, multiple types of models can be combined to optimize the energy savings (e.g., and/or comfort levels, etc.) within the building zone.

Figure 15:
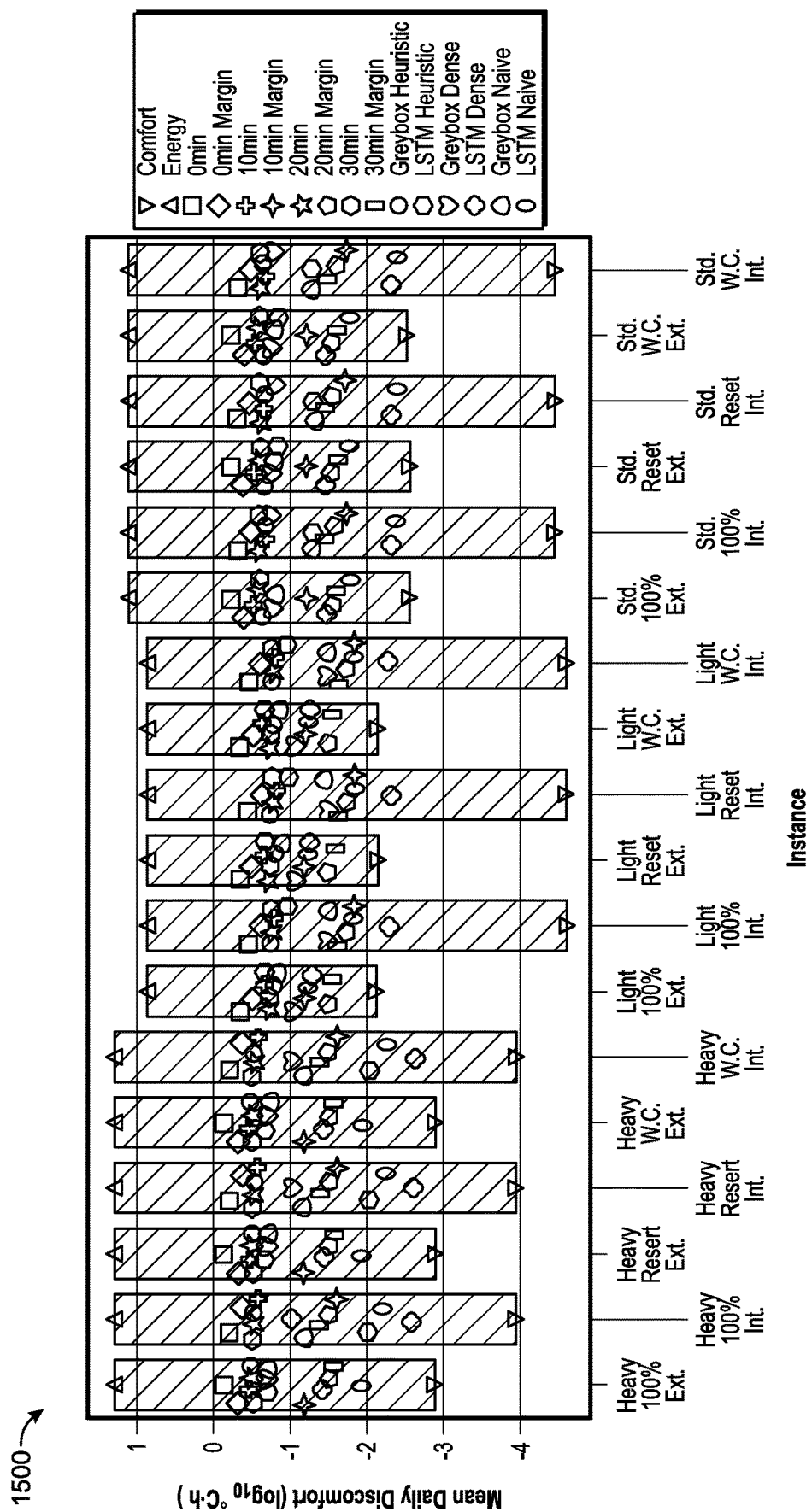
FIG. 15 is a diagram of comfort levels in a building zone, which can be implemented in the building of FIG. 1, according to some embodiments.

Referring now to FIG. 15, a diagram 1500 for showing a case study for comfort satisfaction is shown, according to some embodiments. Diagram 1500 shows the potential comfort level increases that can be achieved via the systems and methods disclosed herein. Diagram 1500 includes a graph that shows the mean daily discomfort ($\log_{10}$° C.·h) (y-axis) vs. Instance (.) (x-axis). The implementations of several types of models (e.g., LSTM Heuristic, Greybox Naïve, etc.) and their respective comfort level increases are shown. Of course, multiple types of models can be combined to optimize the comfort levels of the occupants within the building zone.

In some embodiments, when building zones (e.g., meeting rooms) are unoccupied, energy can be saved by raising the setpoint. Occupancy information may be available from meeting schedule, and the setpoint can be raised when a meeting ends and lower it when the next meeting starts. In some embodiments, since cooling takes time, setpoint changes need to be proactive to ensure comfort. In some embodiments, controller 502 may generate setpoints with low computational loads, allow schedules of building zones to be updated in real time, analyze building zones independently or in combination, and may or may not rely on historical data.

In some embodiments, the systems and methods disclosed herein can be configured to develop a comfort model to predict time-varying comfort regions. These may be based on occupant comfort feedback and may be personalized. In some embodiments, the constraints can be provided to pre-cooling algorithms (e.g., within controller 502, etc.) instead of default comfort schedules.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for controlling comfort in a building zone, the method comprising:
    receiving historical data, the historical data indicative of comfort and occupancy of the building zone during one or more historical states;
    training a system model to represent a dynamic response of the building zone based on the historical data;
    obtaining a policy function that defines a stage cost over a time horizon based on a set of predicted inputs to equipment that operate to affect the comfort in the building zone and predicted outputs indicative of the comfort in the building zone;
    determining a control law by optimizing the policy function, the control law implemented as a neural network configured to process the system model, wherein determining the control law comprises determining a set of parameters that define a relationship between one or more inputs to the neural network and one or more outputs of the neural network, and wherein optimizing the policy function comprises (i) determining a value of the stage cost for a plurality of different values of the set of parameters and (ii) selecting values of the set of parameters that optimize the value of the stage cost; and
    performing online control of the building zone using the control law.

2. The method of claim 1, wherein training the system model to represent the dynamic response of the building zone comprises:

training a plurality of models, each of the plurality of models configured to represent a system response, wherein each system response uses different control schemes, wherein the plurality of models comprise system models; and selecting the system model based on the system models responsive to determining an accuracy of the system model in representing the dynamic response of the building zone is higher than an accuracy of other models of the plurality of models.

3. The method of claim 1, wherein determining the control law by optimizing the policy function comprises:

minimizing an average value of the policy function using a plurality of control laws each implemented as a neural network and configured to process the system model; and selecting the control law from the plurality of control laws resulting in a lowest minimized average value associated with the policy function.

4. The method of claim 1, wherein:

training the system model comprises training at least one of a Long Short Term Memory (LSTM) model, a Greybox model, a linear physics model, or a disturbance model, and determining the control law by optimizing the policy function comprises optimizing at least one of a dense policy, a naïve policy, or a rule-based policy.

5. The method of claim 1, further comprising:

performing online control of the building zone using a rule-based policy, the rule-based policy configured to receive state data of the building zone and determine comfort setpoint adjustments based on the state data; and collecting the state data and associated comfort setpoint adjustments over a period of time to be used as the historical data;

wherein training the system model to represent the dynamic response of the building zone comprises training the system model using the collected state data and the associated comfort setpoint adjustments; and wherein performing online control of the building zone using the control law occurs after performing online control of the building zone using the rule-based policy.

6. The method of claim 5, further comprising:

comparing an implementation of the rule-based policy with an implementation of the control law;

determining that the implementation of the control law provides an increased level of comfort or increased level of energy savings above a predetermined threshold; and replacing online control using the rule-based policy with online control using the control law.

7. The method of claim 1, wherein:

training the system model comprises training the system model to determine adjustments of manipulated variables (MVs) that will approach a control variable (CV) setpoint based on the historical data, the historical data comprising sets of CVs, MVs, and disturbance variables (DVs);

the CVs comprise at least one of: the temperature of the building zone or variable air volume (VAV) airflow entering the building zone;

the MVs comprise at least one of: a heating setpoint of the building zone or a cooling setpoint of the building zone; and the DVs comprise at least one of: ambient temperature, solar intensity, or scheduled occupancy of the building zone.

8. A controller for controlling comfort in a building zone, the controller comprising one or more processors and one or more memories storing instructions that, when executed by the one or more processors, cause the one or more processors to perform operations comprising:

receiving historical data, the historical data indicative of comfort and occupancy of the building zone during one or more historical states;

training a system model to represent a dynamic response of the building zone based on the historical data;

obtaining a policy function that defines a stage cost over a time horizon based on a set of predicted inputs to equipment that operate to affect the comfort in the building zone and a predicted outputs indicative of the comfort in the building zone;

determining a control law by optimizing the policy function, the control law implemented as a neural network configured to process the system model, wherein determining the control law comprises determining a set of parameters that define a relationship between one or more inputs to the neural network and one or more outputs of the neural network, and wherein optimizing the policy function comprises (i) determining a value of the stage cost for a plurality of different values of the set of parameters and (ii) selecting values of the set of parameters that optimize the value of the stage cost; and performing online control of the building zone using the control law.

9. The controller of claim 8, wherein training the system model to represent the dynamic response of the building zone comprises:

training a plurality of models, each of the plurality of models configured to represent a system response, wherein each system response uses different control schemes, wherein the plurality of models comprise system models; and selecting the system model based on the system models responsive to determining an accuracy of the system model in representing the dynamic response of the building zone is higher than an accuracy of other models of the plurality of models.

10. The controller of claim 8, wherein:

training the system model comprises training at least one of a Long Short Term Memory (LSTM) model, a Greybox model, a linear physics model, or a disturbance model, and determining the control law by optimizing the policy function comprises optimizing at least one of a dense policy, a naïve policy, or a rule-based policy.

11. The controller of claim 8, wherein determining the control law by optimizing the policy function comprises:

minimizing an average value of the policy function using a plurality of control laws each implemented as a neural network and configured to process the system model; and selecting the control law from the plurality of control laws resulting in a lowest minimized average value associated with the policy function.

12. The controller of claim 8, wherein the instructions further cause the one or more processors to perform operations comprising:

performing online control of the building zone using a rule-based policy, the rule-based policy configured to receive state data of the building zone and determine comfort setpoint adjustments based on the state data; and collecting the state data and associated comfort setpoint adjustments over a period of time to be used as the historical data; and wherein training the system model to represent the dynamic response of the building zone comprises training the system model using the collected state data and the associated comfort setpoint adjustments; and wherein performing online control of the building zone using the control law occurs after performing online control of the building zone using the rule-based policy.

13. The controller of claim 12, wherein the instructions further cause the one or more processors to perform operations comprising:

comparing an implementation of the rule-based policy with an implementation of the control law;

determining that the implementation of the control law provides an increased level of comfort or increased level of energy savings above a predetermined threshold; and replacing online control using the rule-based policy with online control using the control law.

14. The controller of claim 8, wherein:

training the system model comprises training the system model to determine adjustments of manipulated variables (MVs) that will approach a control variable (CV) setpoint based on the historical data, the historical data comprising sets of CVs, MVs, and disturbance variables (DVs);

the CVs comprise at least one of: the temperature of the building zone or variable air volume (VAV) airflow entering the building zone;

the MVs comprise at least one of: a heating setpoint of the building zone or a cooling setpoint of the building zone; and the DVs comprise at least one of: ambient temperature, solar intensity, or scheduled occupancy of the building zone.

15. One or more non-transitory computer-readable storage media having computer-executable instructions stored thereon that, when executed by one or more processors of a control system, cause the control system to perform operations comprising:

receiving historical data, the historical data indicative of comfort and occupancy of a building zone during one or more historical states;

training a plurality of models, each of the plurality of models configured to represent a system response, wherein the plurality of models comprises a system model;

selecting the system model based on the system model responsive to determining accuracy of the system model in representing a dynamic response of the building zone is higher than an accuracy of other models of the plurality of models;

obtaining a policy function that defines a stage cost over a time horizon based on a set of predicted inputs to equipment that operate to affect the comfort in the building zone and predicted outputs indicative of the comfort in the building zone;

determining a control law by optimizing the policy function, the control law implemented as a neural network configured to process the system model, wherein determining the control law comprises determining a set of parameters that define a relationship between one or more inputs to the neural network and one or more outputs of the neural network, and wherein optimizing the policy function comprises (i) determining a value of the stage cost for a plurality of different values of the set of parameters and (ii) selecting values of the set of parameters that optimize the value of the stage cost; and performing online control of the building zone using the control law to pre-condition the building zone.

16. The media of claim 15, wherein using the control law to pre-condition the building zone comprises:

providing control signals to heating, ventilation, and air conditioning (HVAC) equipment to lower the temperature of the building zone prior to the building zone being occupied; or providing control signals to the HVAC equipment to increase the temperature of the building zone prior to the building zone being occupied.

17. The media of claim 15, wherein determining the control law by optimizing the policy function comprises:

minimizing an average value of the policy function using a plurality of control laws each implemented as a neural network and configured to process the system model; and selecting the control law from the plurality of control laws resulting in a lowest minimized average value associated with the policy function.

18. The media of claim 15, wherein:

training the system model comprises training at least one of a Long Short Term Memory (LSTM) model, a Greybox model, a linear physics model, or a disturbance model, and determining the control law by optimizing the policy function comprises optimizing at least one of a dense policy, a naïve policy, or a rule-based policy.

19. The media of claim 15, wherein the media further comprises:

performing online control of the building zone using a rule-based policy, the rule-based policy configured to receive state data of the building zone and determine comfort setpoint adjustments based on the state data; and collecting the state data and associated comfort setpoint adjustments over a period of time to be used the historical;

wherein training the system model to represent the dynamic response of the building zone comprises training the system model using the collected state data and the associated comfort setpoint adjustments; and wherein performing online control of the building zone using the control law occurs after performing online control of the building zone using the rule-based policy.

20. The media of claim 15, wherein:

training the system model comprises training the system model to determine adjustments of manipulated variables (MVs) that will approach a control variable (CV) setpoint based on the historical data, the historical data comprising sets of CVs, MVs, and disturbance variables (DVs);

the CVs comprise at least one of: the temperature of the building zone or variable air volume (VAV) airflow entering the building zone;

the MVs comprise at least one of: a heating setpoint of the building zone or a cooling setpoint of the building zone; and the DVs comprise at least one of: ambient temperature, solar intensity, or scheduled occupancy of the building zone.

\* \* \* \* \*